(12) United States Patent
Teranishi et al.

(10) Patent No.: US 6,434,440 B1
(45) Date of Patent: Aug. 13, 2002

(54) PRODUCTION ESTIMATE MANAGEMENT SYSTEM

(75) Inventors: Yoshiharu Teranishi; Hajime Ogawa; Yoshikazu Narita; Toshiyuki Matsume; Masaru Nomura, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/275,023

(22) Filed: Mar. 24, 1999

(30) Foreign Application Priority Data

Aug. 27, 1998 (JP) .......................................... 10-241820

(51) Int. Cl.⁷ .............................................. G06F 19/00
(52) U.S. Cl. ............................... 700/97; 700/95; 700/1; 700/121; 700/99
(58) Field of Search ........................... 700/97, 99, 105, 700/95, 1, 121

(56) References Cited

U.S. PATENT DOCUMENTS

| | | | | |
|---|---|---|---|---|
| 5,237,508 A | * | 8/1993 | Furukawa et al. | 700/100 |
| 5,369,570 A | * | 11/1994 | Parad | 705/8 |
| 5,623,580 A | * | 4/1997 | Inoue et al. | 706/46 |
| 5,657,453 A | * | 8/1997 | Taoka et al. | 705/1 |
| 5,826,040 A | * | 10/1998 | Fargher et al. | 705/8 |
| 5,946,663 A | * | 8/1999 | Tanaka et al. | 705/8 |
| 6,049,742 A | * | 4/2000 | Milne et al. | 700/99 |
| 6,226,561 B1 | * | 5/2001 | Tamaki et al. | 700/100 |
| 6,278,901 B1 | * | 8/2001 | Winner et al. | 700/99 |

FOREIGN PATENT DOCUMENTS

KR     97-68755      5/1999

OTHER PUBLICATIONS

Office Action mailed Apr. 16, 2001 for Korean Publication No. 97–68755.

* cited by examiner

Primary Examiner—Thomas Black
Assistant Examiner—Ronald D Hartman, Jr.
(74) Attorney, Agent, or Firm—Staas & Halsey LLP

(57) ABSTRACT

A process plan unit 2 generates a process plan based on an operation plan of an operation plan unit 1. A work plan unit 3 generates a work plan based on the operation plan and the process plan. Since each plan of the process plan and the work plan inherits and uses the simulation result from the operation plan, a consistent plan can be made. In addition, an planned work management unit 4 checks the operation plan, the process plan, and the comparison between the actual result and the operation plan and the process plan, clarifies the cause of the problem of the difference between the actual result and the plans, and quickly makes a recovery plan.

19 Claims, 23 Drawing Sheets

PRODUCTION ESTIMATE MANAGEMENT SYSTEM

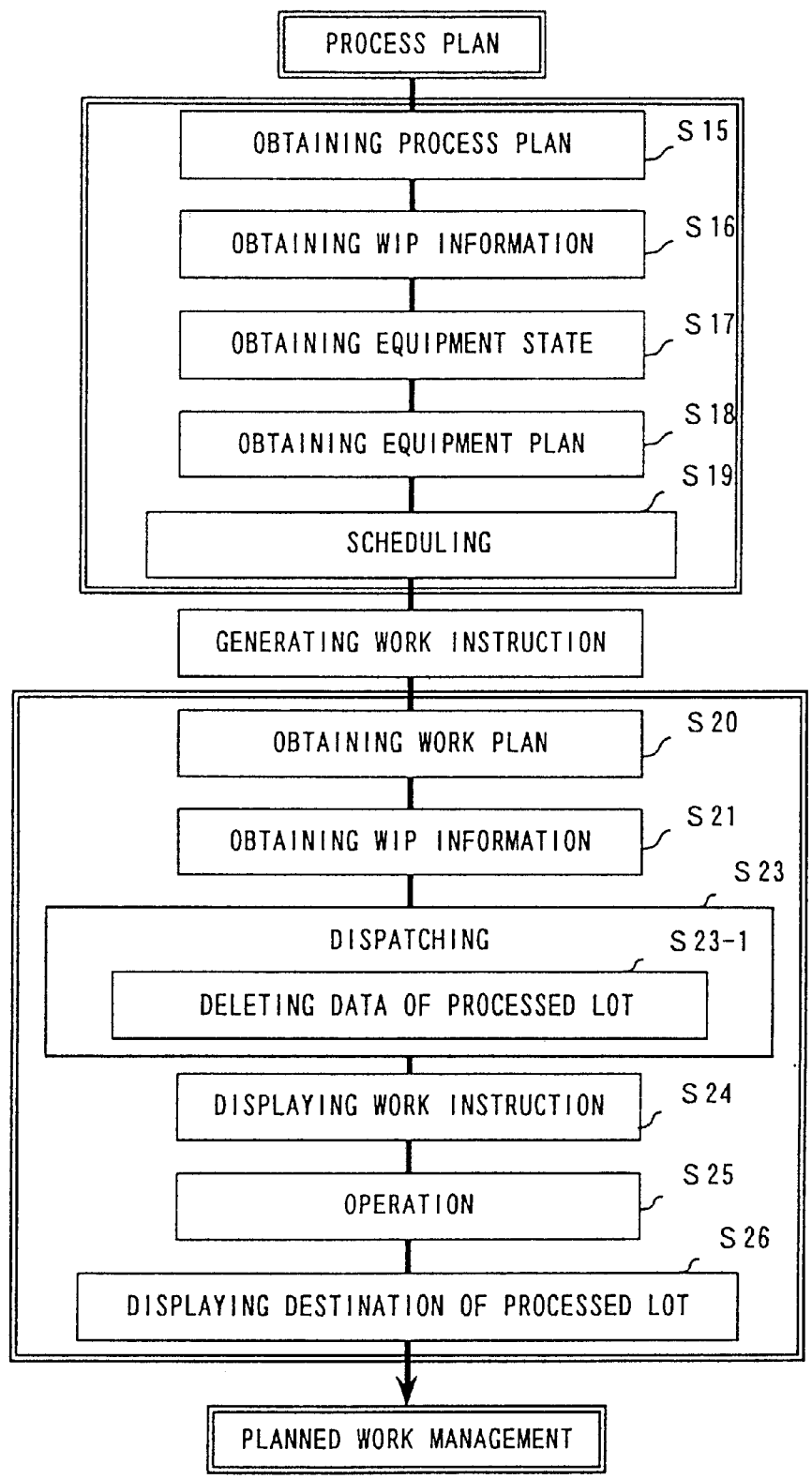
F I G. 7

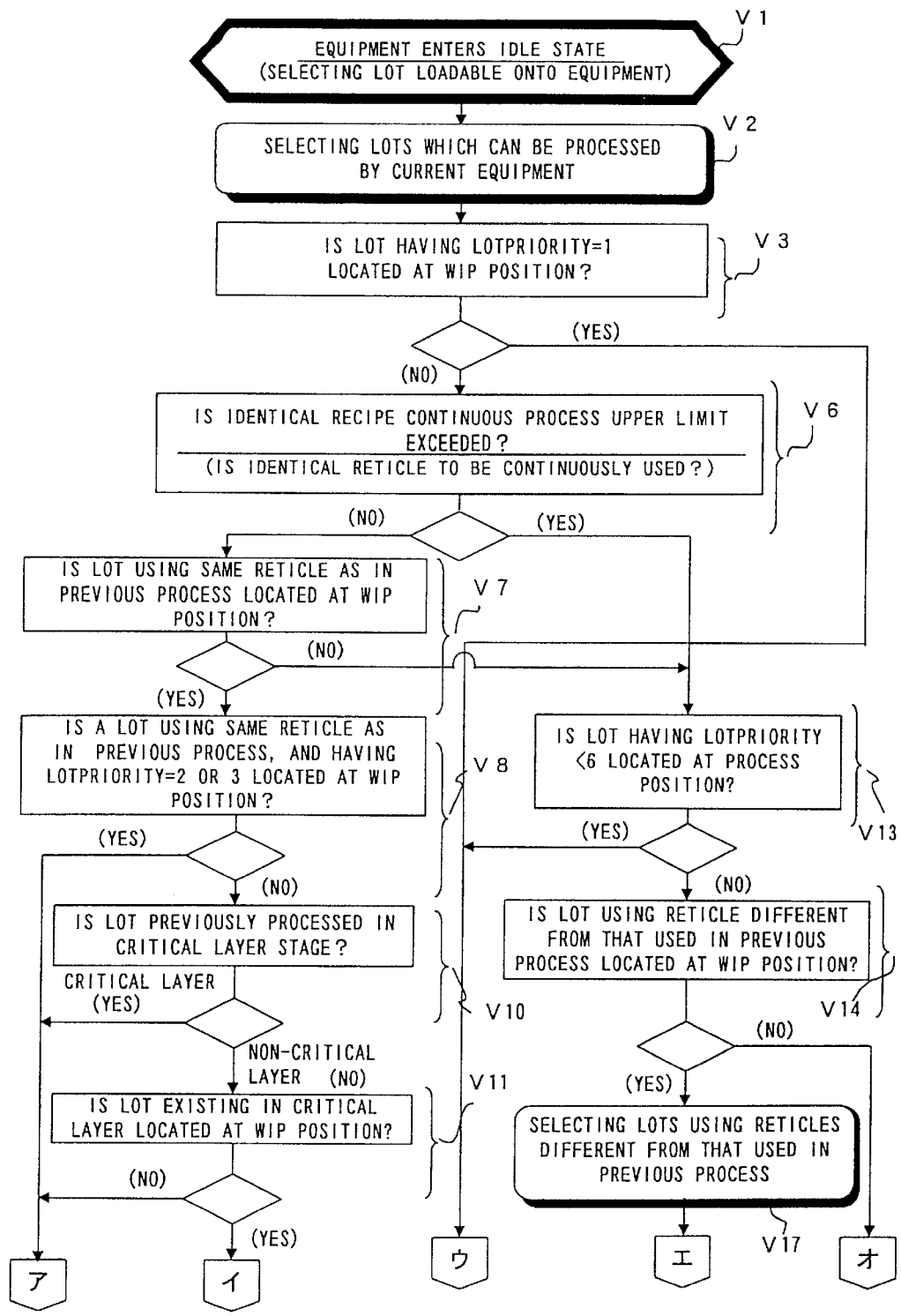
F I G. 1 2

ST1 : AVERAGE PROCESS STEP ACTUAL RESULT DATA
ST2 : PROCESS RESIDENT TIME FOR EACH LOT
ST3 : METHOD 1 : THEORETICAL TIME FOR EACH EQUIPMENT
ST2': METHOD 2 : AVERAGE TIME FOR EACH EQUIPMENT
       AS SIMULATION RESULT
ST4 : PREDICTED TIME FOR EACH EQUIPMENT

| EQUIPMENT TYPE NAME | WORK STATION NAME | EQUIPMENT NAME | RECIPE NAME | PROCESS TIME |
|---|---|---|---|---|
| EQUIPMENT TYPE-A | Work Station-A1 | Equipment-A11 | Recipe-m01<br>Recipe-m02 | 15 [min/p]<br>10 [min/p] |
| | | Equipment-A12 | Recipe-n01<br>Recipe-n02 | 14 [min/p]<br>12 [min/p] |
| | Work Station-A2 | Equipment-A21 | Recipe-o01<br>Recipe-m02<br>Recipe-o03 | 11 [min/p]<br>12 [min/p]<br>13 [min/p] |

Eqp 11 Recipa m01
Eqp 19 Recp  n02
- - - - - - - - - - - -

FIG. 20(b)

Eqp 12 Recipe m02
Eqp 16 Recipe  m01
- - - - - - - - - - - -

FIG. 20(c)

Eqp   Recp
- - - - - - - - - - - -

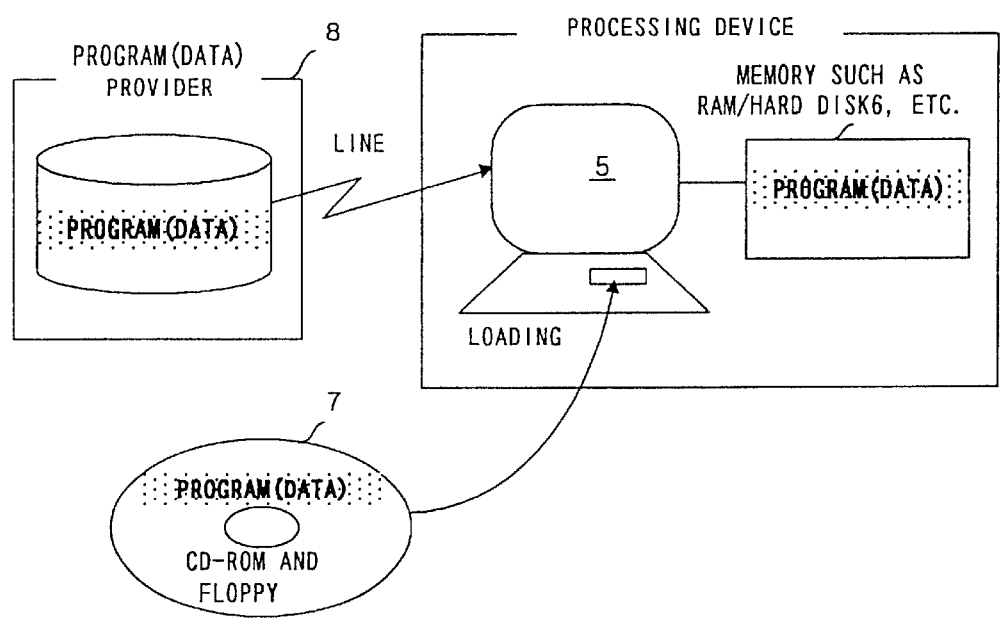
F I G. 23

PRODUCTION ESTIMATE MANAGEMENT SYSTEM

BACKGROUND OF THE INVENTION

1. Field of the Invention

The present invention relates to an optimum production estimate system and method for realizing planned production in a factory in which the order of using equipments are set for each job, that is, a factory functioning as a so-called jobshop.

2. Description of the Prior Art

Recently, a factory functioning as a jobshop such as a factory of semiconductor devices requires planned production highly responsive to a market trend. Therefore, a high-precision production estimate system is required to prepare planned production in which a necessary number of products can be output as necessary.

In a conventional jobshop-type factory, an output amount is estimated by a simulator using a random function to represent practical market data in preparing an operation plan. In addition, there is a method of planning an output date and issuing an instruction to work based on a heap/scatter method in consideration of an equipment load when a process plan is made.

For example, a simulation method is used when a relatively long-term process plan for about a few months is made, and an instruction in the heap/scatter method is used in a real-time work plan for about a few tens minutes or a few hours.

In the above described conventional method, different algorithms, rules, and parameters are used for respective plans. When the simulation method is used in a long-term plan and a work instruction is issued in the heap/scatter method for a short-term plan, information cannot be shared between the methods, thereby causing inconsistency in production plan. Furthermore, the heap/scatter method cannot have the function of managing planned production.

Therefore, it has been very difficult to prepare a complete plan from an operation plan to a work plan. Additionally, there has been the problem that workers are assigned a work plan with an imprecise estimate, thereby failing to successfully realize an original operation plan.

SUMMARY OF THE INVENTION

The present invention aims at solving the above described problems, and providing a production estimate management system and method for easily realizing a complete and consistent operation plan by preparing a complete production plan from an operation plan to a work plan using consistent algorithms, rules, and parameters.

The purpose of the present invention can be attained by providing a production estimate management system including: an operation plan unit for making a long-term operation plan using a specific algorithm and a parameter; a process plan unit for making a medium-term process plan using the algorithm and parameter used in the operation plan made by the operation plan unit; a work plan unit for making a short-term work plan using the algorithm and parameter used in the operation plan and the process plan; and an estimated result management unit for comparing the result obtained according to the operation plan, the process plan, and the work plan with the operation plan or the process plan, and solving the problem if it is indicated by the comparison result.

The operation plan made by the operation plan unit is a relatively long-term plan for about a week through a few months relating to, for example, an input plan, moves target, a turnover target, an output volume target, etc. The operation plan unit makes these plans according to a predetermined algorithm using a predetermined parameter. The process plan unit makes a plan of, for example, the amount of process and process order for about one shift through a few days (for example, three days). This process plan is made using the same algorithm and parameter as the operation plan unit. Furthermore, the work plan unit makes a plan of, for example, assigning a lot and an equipment in consideration of the current progress in each process step. This work plan is made using the same algorithm and parameter as the above described operation plan unit.

With the above described configuration, the planned work management unit compares the actual work performed according to the work plan made by the work plan unit with each of the above described plans, and corrects the plans when, for example, an abnormal result is obtained.

With the above described configuration, an operation plan, a process plan, and a work plan can be made using the same algorithm and parameter, thereby obtaining a consistent and efficient operation plan. In addition, the planned work management unit automatically compares the actual work with each of the above described plans, and corrects an abnormal result when it is obtained.

Furthermore, it compares the operation plan with the process plan, and changes, for example, the operation plan or the process plan as necessary, thereby detecting a problem and taking quick and appropriate action against the problem, if the plan itself includes the problem, in following the operation plan and the process plan before actually performing the operation.

Additionally, a progress support information generation unit is provided to distribute, for example, a material use plan and an equipment maintenance plan to the related sections based on the process plan generated by the operation plan unit or the process plan unit. Thus, even in a factory which cannot currently obtain progress information about a product for each equipment, the present invention can generate the progress information for each equipment.

BRIEF DESCRIPTION OF THE DRAWINGS

FIG. 7 is a flowchart showing a plan of a process preformed when an equipment state changes in addition to a periodical process;

FIG. 12 is a flowchart showing the second embodiment of the present invention;

FIG. 19 shows the contents of the equipment used in the fourth embodiment, the type of the equipment, the work station, the name of an equipment; the name of a recipe, and the relationship among the abilities of processes;

FIG. 20 shows the procedure of processing a lot;

FIG. 23 shows the configuration of the present embodiment using a storage medium.

DESCRIPTION OF THE PREFERRED EMBODIMENT

Figure 1A:
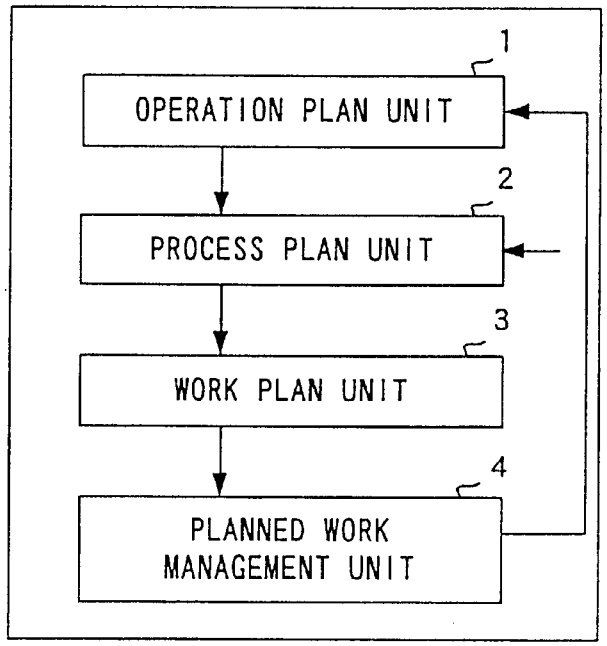
FIG. 1A shows the basic configuration of the production estimate management system according to the present invention.
Figure 1B:
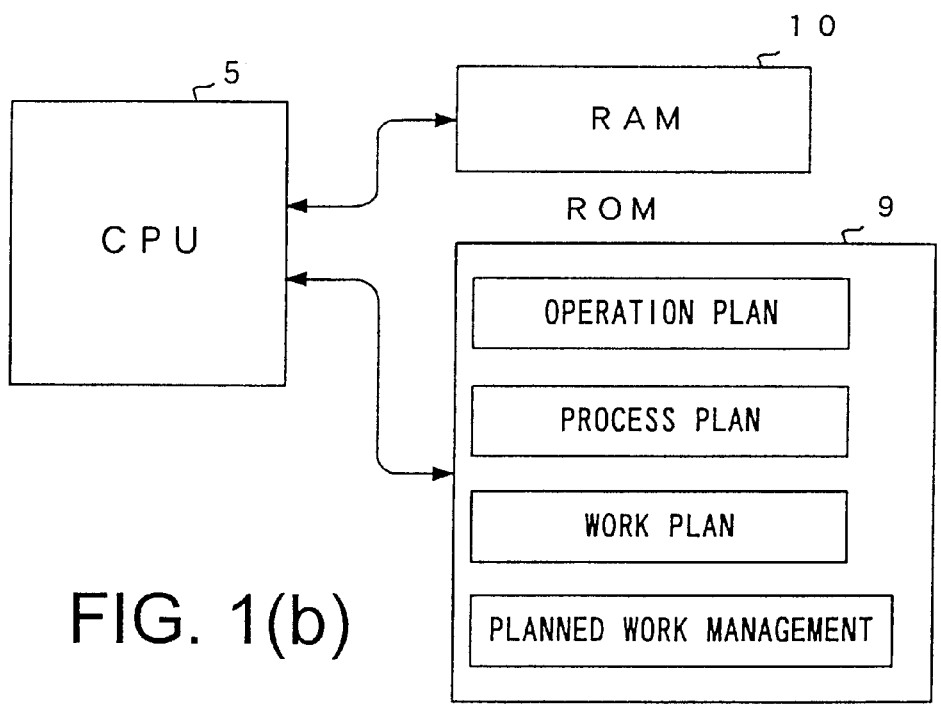
FIG. 1B shows the system configuration using a computer.

FIG. 1A shows the basic configuration of the production estimate management system according to the present invention, and FIG. 1B shows the system for realizing the present invention using, for example, a computer. The configuration shown in FIGS. 1A and 1B are first described, and then each of the embodiments of the present invention is described. In addition, an example of the production in a jobshop, for example, a production of a semiconductor device, is described below.

In FIG. 1A, the production estimate management system according to the present invention comprises an operation plan unit 1, a process plan unit 2, a work plan unit 3, and an estimated result management unit 4.

The operation plan unit 1 makes a relatively long-term plan for about a week through a few months relating to an input plan, moves target, a turnover target, an output volume target, etc. The input plan refers to a plan for the time, the amount, the type including variations, etc. of, for example, a semiconductor wafer. The moves target refers to, for example, the target number of moves per day. The turnover target refers to the target of a turnover for each equipment obtained by, for example, dividing the number of moves by the number of works in process. Furthermore, the output volume target refers to the target output number of finished products. The finished products refer to, for example, a wafer completed with the IC (integrated circuit).

The process plan unit 2 makes, for example, a plan of a lot process amount/process order for one shift through three days or so. One shift refers to working hours. For example, when a 3-shift system is applied in 24 hours (1 day), one shift equals 8 hours. Therefore, the process plan unit 2 makes a plan of a lot process amount and a lot process order at intervals of, for example, 8 hours through 3 days.

The work plan unit 3 makes a plan of assigning a lot to an equipment under real-time determination to proceed with the lot which has been received in each area. The process is periodically at very short intervals of, for example, 30 minutes, or when an equipment state changes.

The planned work management unit 4 consistently links the results of the above described operation plan, process plan, and work plan, and compares each plan with the actual.

FIG. 1B shows the configuration of the production estimate management system to be realized using, for example, a computer. The program of the production estimate management system according to the present embodiment is stored on ROM 9. The CPU 5 reads the program stored on the ROM 9 to RAM 10, and performs the production estimate management process of the present embodiment.

Figure 2:
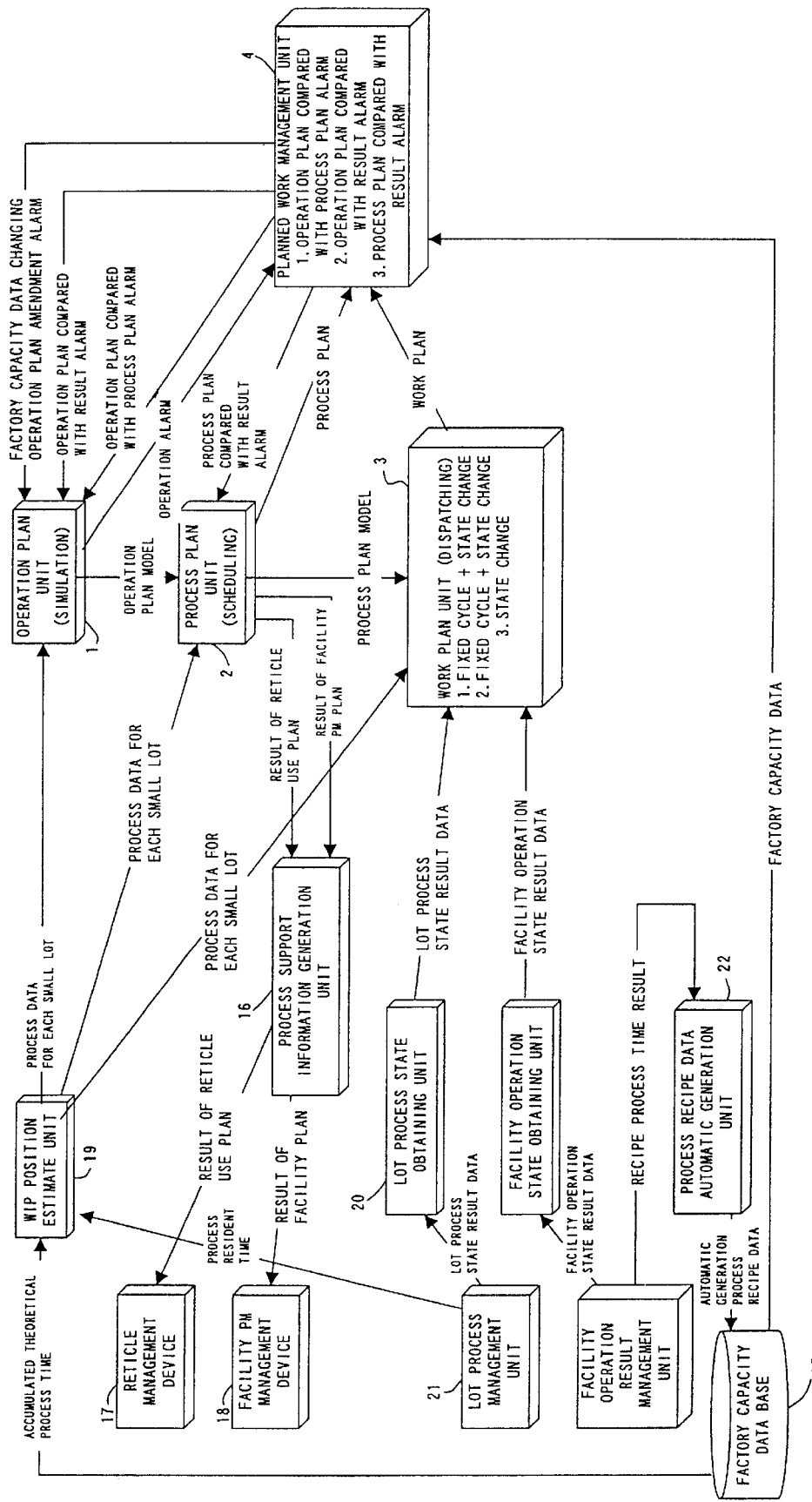
FIG. 2 is a block diagram of the production estimate management system.

Each embodiment of the present invention is described below in detail based on the above described basic configuration. The block diagram of the production estimate management system shown in FIG. 2 is a view indicating each of the embodiments of the present invention described below.

<First Embodiment>

The present embodiment indicates each plan of the above described production estimate management system with the basic configuration. In the embodiment, the algorithm, rules, parameters described above are used as is in the lower order plan units, and the contents of each of the plans are automatically and consistently processed.

Figure 3A:
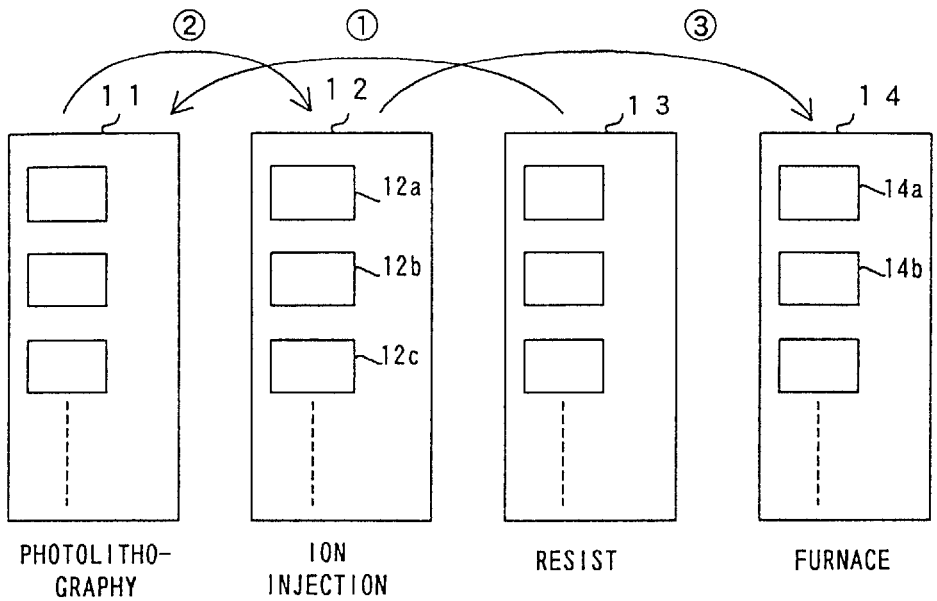
FIG. 3A shows each area in a semiconductor factory and an equipment in each area.

First, FIG. 3A shows the configuration used in the factory of semiconductor devices. The factory of semiconductor devices shown in FIG. 3A is a model factory for a simulation described below. For example, this factory includes a photolithography area 11, an ion implantation area 12, a resist coating area 13, a furnace area 14, etc., and each area comprises a plurality of equipments. For example, the ion implantation area 12 comprises a preprocessing equipment 12a, an ion implantation device 12b, an after-process equipment 12c, etc. The furnace area 14 comprises a diffusion furnace 14a, a chemical vapor deposition (CVD) equipment 14b, a physical vapor deposition (PVD) equipment 14c, etc. The factory according to the present embodiment is a jobshop factory, that is, the lot is not processed in order of area 11→12→13 . . . . For example, in the lot processing process, after the resist coating equipment is used in the area 13 as shown in FIG. 3A, control is passed to the photolithography equipment in the area 11 (1 shown in FIG. 3A). After generating a resist pattern, control is passed to the ion implantation equipment in the ion implantation area 12 to implant impurities (2 shown in FIG. 3A). Then, control is passed to the furnace area 14 (3 shown in FIG. 3A), and an annealing process is performed. Thus, the lot is transferred in each process. The route depend on each lot, and the lot is transferred to an equipment according to its own recipe.

Figure 3B:
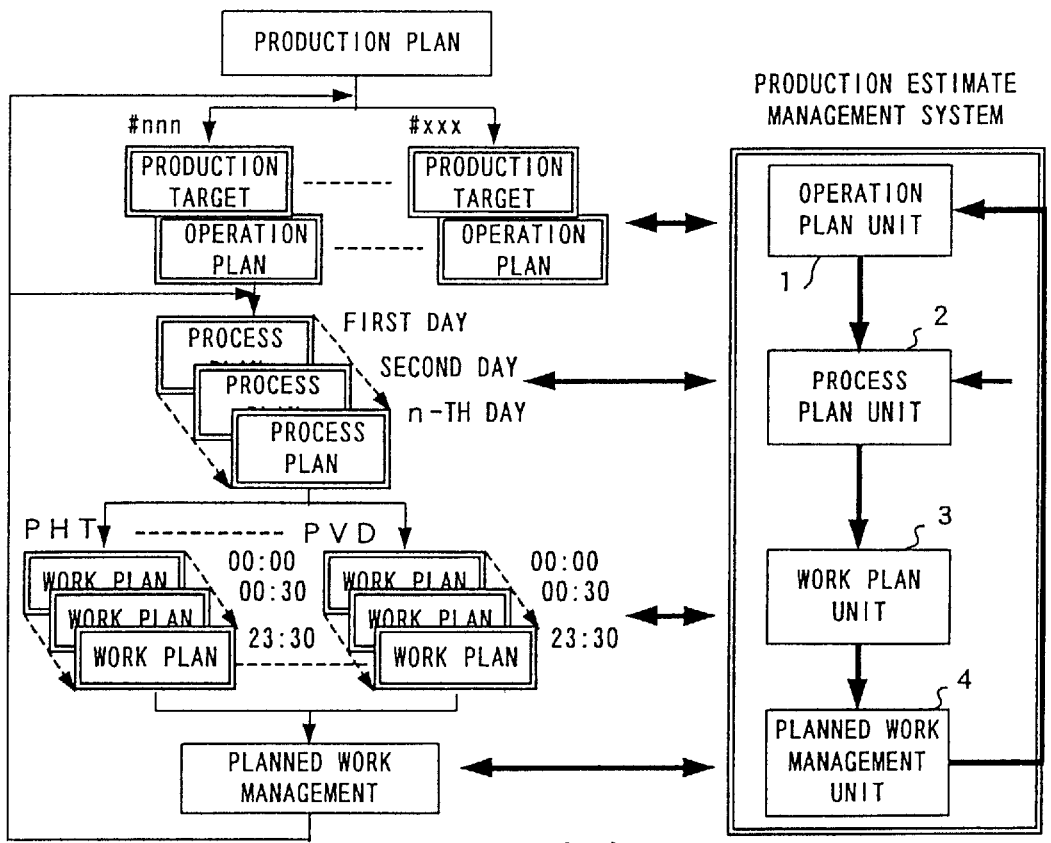
FIG. 3B shows the outline of each plan of the production estimate management system.

FIG. 3B shows the outline of each plan of the above described production estimate management system, and each plan unit performs a process based on the outline shown on the left in FIG. 3B. For example, the operation plan unit 1 makes operation plans for the fab "#nnn". It is processed at intervals of one through a few months.

On the other hand, the process plan unit 2 makes plans at intervals of 1 shift through about 3 days as described above. In the example shown in FIG. 3B, a process plan is made every day according to the above described operation plan and distributes the plan to each of the relevant sections after printing it.

The work plan unit 3 makes a work plan in real time for each equipment or process. For example, it makes a work plan at intervals of, for example, 30 minutes for each equipment such as a photolithography equipment, an ion implantation equipment, a diffusion furnace equipment, etc. Then, it prints each plan and distributes it to each of the related sections.

Next, the processing operation performed in the above described production estimate management system is described below.

Figure 4:
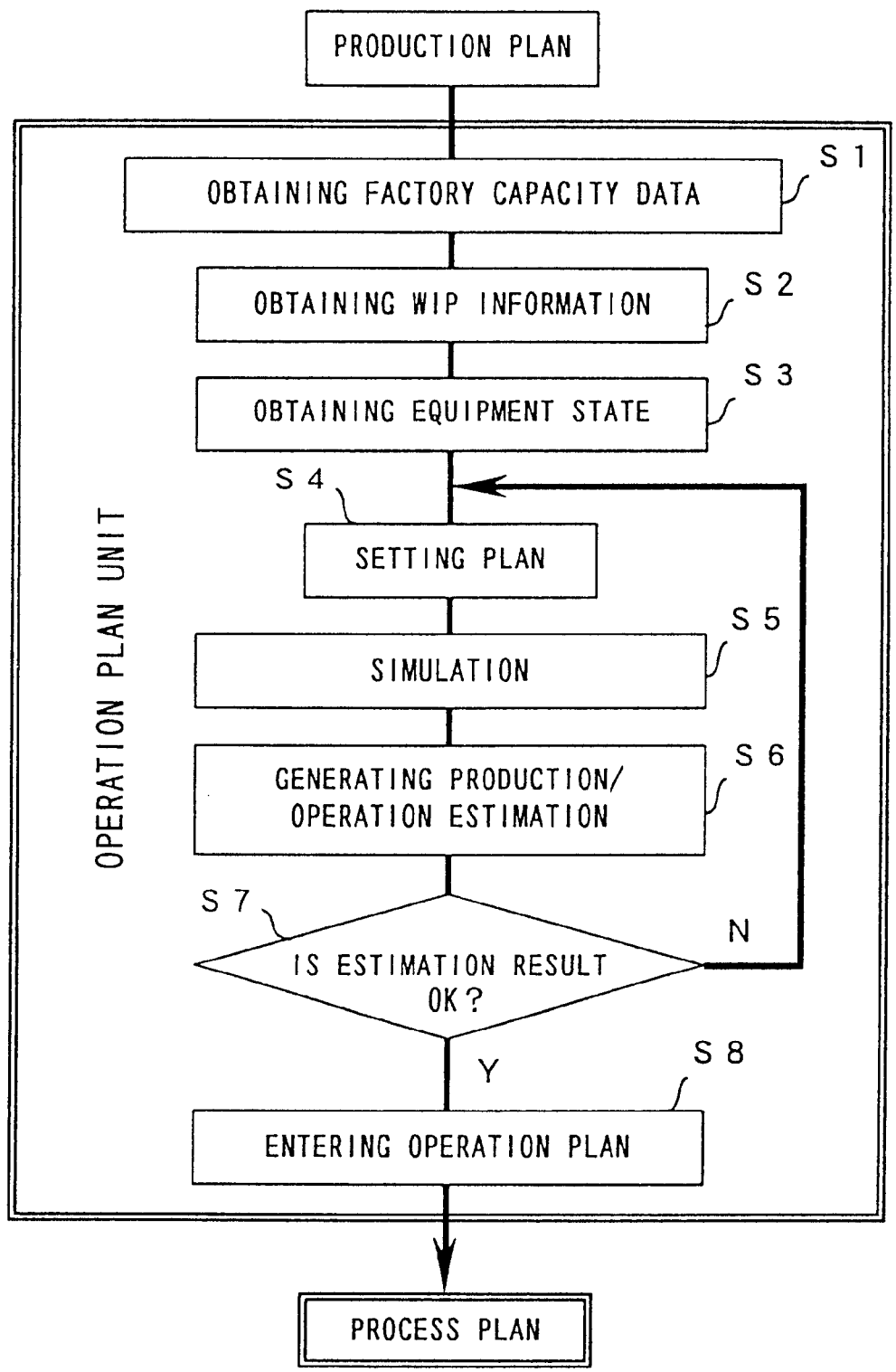
FIG. 4 shows the process procedure of the operation plan unit.

First, FIG. 4 shows the procedure of the process performed by the operation plan unit 1. In FIG. 4, the capacity data of a factory is obtained in step S1. This process is performed to obtain the capacity data of, for example, a model semiconductor factory, obtain information from a factory capacity data base 15 shown in FIG. 2, and generate a model of a virtual factory. For example, information about the number of equipments in the factory, the equipments to be used, the capacity of the equipments, etc. is obtained. In addition, the information about the transportation of the wafer and materials between equipments, and the procedure of the processes depending on the type and variations of lots is also obtained.

Next, a progress information is obtained (S2). That is, the processing state of a lot, a condition of a waiting lot, etc. are obtained. The information about the above described processing state of a lot is based on the data provided from a WIP position estimate unit 19. The operating process by the WIP position estimate unit 19 is described later in detail by referring to another embodiment.

Then, the state information of each equipment is obtained (S3). That is, the information about equipments which are currently active or inactive, the information as to when the inactive equipments are to be active, etc. are obtained. On the other hand, about the currently active equipments, the information about active conditions, the current process lot number, the maintenance conditions, etc. is obtained.

When the above described process state and equipment state are obtained, a plan is actually set (S4). As described above, the plan is set including the input plan, moves target, turnover target, output volume target, etc. That is, after setting the equipment information of a model factory as described above, a process plan for 1 week through a few months is made. For example, the product type and the size of a lot are set according to a request from a customer. There is a case, as with the memory IC, the product type and the size of a lot can be appropriately set according to a predetermined market trend.

After the above described processes, a simulation is set (S5). The simulation refers to a computation process performed by the operation plan unit 1 based on the settings of the above described various information. The process is performed using a random function to predict the production and operation. For example, in the computation, a failure factor is computed using an exponential distribution. The transportation time is computed using a triangular distribution for the transfer of a wafer and materials.

According to the data obtained as a result of the above described simulation, a production and operation prediction is set (S6). In the production and operation prediction, the number of moves, the number of output lots, the turnover, etc. are estimated for each equipment, process (area), or shift.

Then, the result is estimated (S7). That is, the simulation result is referred to as a target value of the production and operation if the above described prediction causes no problems (YES in S7)(S8). On the other hand, when there are problems in the prediction (NO in S7), the input plan, moves target, turnover target, output volume target, etc. are set again (S4). For example, the size of a lot is changes, the number of lots is changed, and the turnover and the number of outputs are changed. Then, the simulation is performed again (S5), the production/operation is predicted (S6), and a prediction result is estimated (S7).

If there are no problems in the estimated target value of the production and operation after repeatedly performing the above described processes, the operation plan is registered (YES in S7)(S8).

Figure 5:
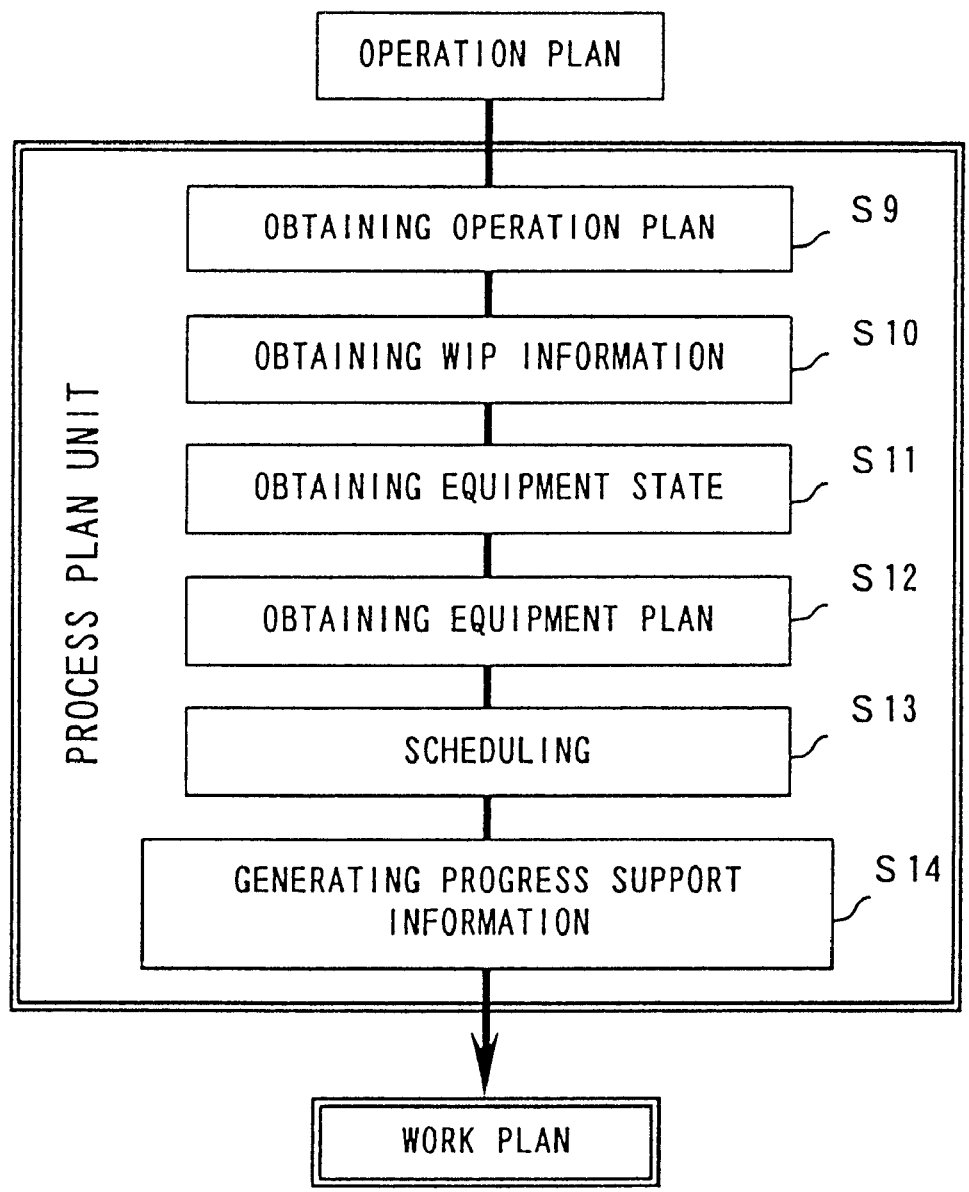
FIG. 5 is a flowchart showing the operation of process performed by the process plan unit.

When the operation plan is made and registered, the process plan is made based on the operation plan. FIG. 5 shows the procedure.

This process plan is first set as described above, and then the registered operation plan is read and obtained (S9). Then, the WIP information is obtained and the equipment state is obtained (S10, S11). To obtain the WIP information and the equipment state equals to obtain the WIP information and the equipment state in the above described operation plan. However, in the process plan, the equipment failure is not taken into account.

Then, an equipment plan obtaining process is performed (S12). In this process, an equipment failure is not taken into account, but the maintenance of an equipment is considered, and information about the maintenance interval of an equipment, the recover timing of an inactive equipment, etc. is obtained.

After the above described process, a schedule is made (S13), and a process plan is generated. The schedule in the process plan is based on the information set in the above described operation plan. The algorithm and parameters used in the process plan are the same as those used in the operation plan. Therefore, the simulation in the operation plan and the schedule in the process plan are performed consistently and efficiently.

Then, the progress support information is generated (S14). The progress support information relates to, for example, the material information of a reticle and the information about the preventive maintenance (PM) of an equipment. The information about the preventive maintenance of an equipment can be, for example, information about a cleaning interval of a quartz jig, a furnace, etc. A progress support information generation unit 16 shown in FIG. 2 generates the above described progress support information, transmits a plan of using a reticle to a reticle management system 17, and transmits an equipment PM plan to a facility PM management system 18.

Figure 6:
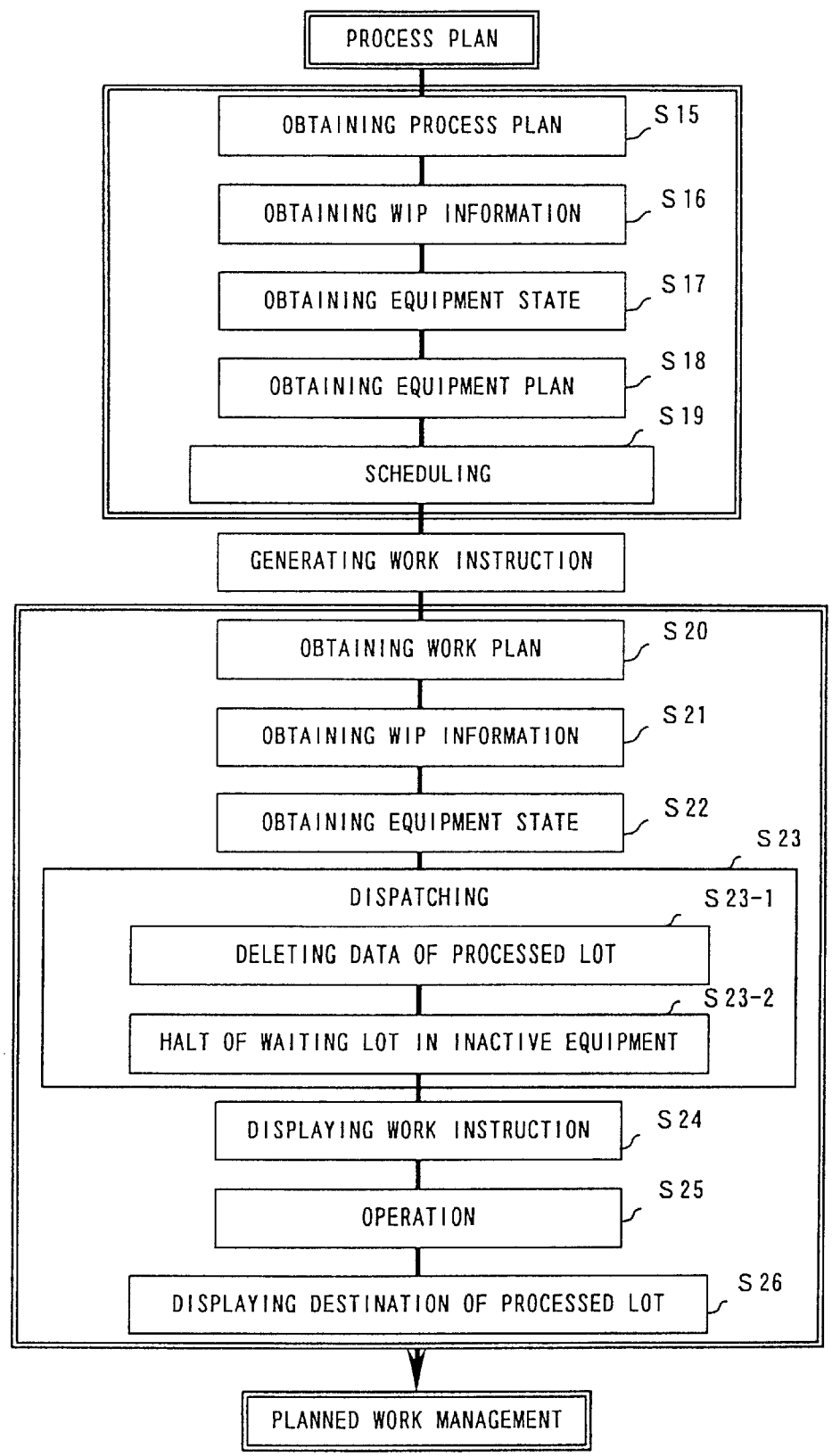
FIG. 6 is a flowchart showing the generation of a plan of work performed on a predetermined cycle.
Figure 8:
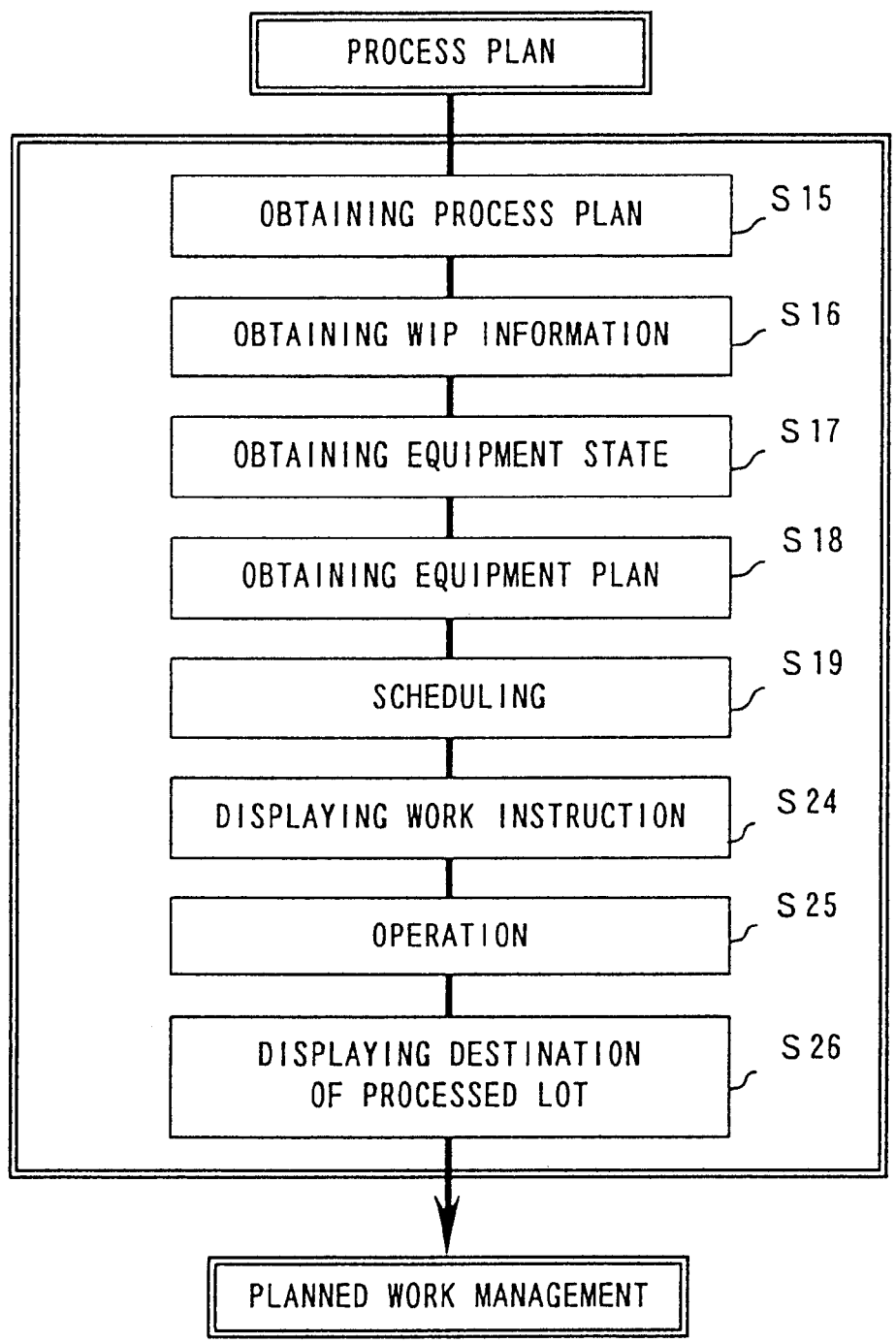
FIG. 8 is a flowchart showing a plan of a process performed when an equipment state and a process state change.

When the process plan is made as described above, a work plan is then prepared. The work plan is carried out on a predetermined cycle of about 30 minutes; when an equipment state changes; or when an equipment state and a WIP information changes in addition to the above described process to be performed on a predetermined cycle. FIG. 6 is a flowchart showing the work plan carried out on a predetermined cycle of about 30 minutes. FIG. 7 is a flowchart including a case in which an equipment state changes in addition to the process performed on the above described predetermined cycle. FIG. 8 is a flowchart showing a case in which both equipment state and WIP information change.

First, the generation of a work plan on a predetermined cycle shown in FIG. 6 is described below. The process plan generated as described above is obtained (S15). Then, a WIP information and an equipment state are obtained (S16, S17). Obtaining the WIP information and the equipment state is similar to that described above. However, since the above described information is obtained at intervals of, for example, 30 minutes in the work plan, a failure condition of an equipment can be immediately informed of as soon as it occurs. The above described WIP information is based on the information provided from a lot process state obtaining unit 20. The WIP information obtaining unit 20 generates the information about the WIP information of a lot according to the actual equipment operation data provided from a lot progress management unit 21.

Then, the equipment plan obtaining process is performed (S18). This process is also performed as described above, but is carried out at short intervals of, for example, 30 minutes. Then, a schedule is made based on the above described settings (S19).

Next, a work instruction for each equipment is generated (in and after step S20). Also in this process, a work plan generated as described above is obtained (S20), and a WIP information and an equipment state are obtained (S21, S22).

Then, a dispatching process is performed (S23). The dispatching process is to delete data of a processed lot (S23-1), and to temporarily stop a waiting lot in an inactive equipment (S23-2). That is, when a process is performed on a predetermined cycle of about 30 minutes, a lot process in a certain equipment may be completed, or an equipment may become inactive (failure) during the process. Information is generated for these cases. For example, when a lot process in a certain equipment is completed, a lot processed in the equipment is deleted (S23-1). When the equipment becomes inactive (failure), a waiting lot belonging to the inactive equipment is temporarily stopped (S23-2).

After the above described process, a work instruction is indicated (S24), an operation is performed (S25), and a destination is indicated for a processed lot (S26). At this time, the result of the operation is printed and distributed to each equipment. In this case, the destination of the processed lot is also printed.

On the other hand, FIG. 7 is a flowchart showing the work plan in which a change in equipment state is considered in addition to a process performed on a predetermined cycle. That is, when an equipment becomes inactive or when an inactive equipment recovers from its inactive state, the above described work plan can be generated.

Therefore, this process is basically the same as that according to the flowchart shown in FIG. 6 except a dispatching process (S23). That is, since a process is performed when an equipment state changes, it is not necessary to temporarily stop a waiting lot belonging to an equipment, which is required in the above described process (process in FIG. 6). Therefore, it is only necessary to delete the data of the already processed lot (S23-1). Other processes are the same as those shown in the flowchart in FIG. 6. First, the generated process plan is obtained (S15). A process state and an equipment state are obtained (S16, S17). An equipment plan obtaining process is performed (S18), and a scheduling process is performed (S19). Then, a work instruction including a different dispatching process as described above is generated (S20 through S23). The work instruction is issued (S24). An operation is performed (S25). A destination is indicated to the completed lot (S26). In this case, too, the operation result is printed, and distributed to each section. The destination of a completed lot can also be printed.

FIG. 8 is a flowchart showing the work plan in which changes in equipment state and WIP information are additionally considered. That is, when an equipment becomes inactive, or when a lot has been completely processed, the above described work plan is performed.

Therefore, in this case, the process is basically the same as that shown in the flowchart in FIG. 6, but the dispatching process (S23) is not required. That is, a temporary lot stopping process (S23-2) performed when an equipment becomes inactive, or a lot deleting process (S23-1) is not required. Therefore, in this case, a generated process plan is first obtained (S15), a WIP information and an equipment state are obtained (S16, S17), an equipment plan obtaining process is performed (S18), and then a schedule is made (S19) as shown in FIG. 8. Next, a work instruction is displayed (S24), an operation is performed (S25), and a destination is indicated for a completed lot (S26). Also in this case, the system can be designed such that the result of the above described operation can be printed and distributed to each equipment, and the destination of the completed lot can be printed.

As described above, process plans and work plans are scheduled based on an operation plan, and an operation is performed. The generated operation plan, process plan, and work plan are indicated to relevant sections, printed, and distributed. Especially, the work plan for each equipment is distributed to a relevant equipment, and production is carried out according to the scheduled process plan.

On the other hand, the planned work management unit 4 compares the operation plan with the process plan. It also compares the operation plan with the actual data, and compares the process plan with the actual data. That is, a simulation result, a scheduling result, and an actual operation result are provided from the above described operation plan unit 1, process plan unit 2, and work plan unit 3 respectively, and are used in comparison with actual operation results.

Figure 9:
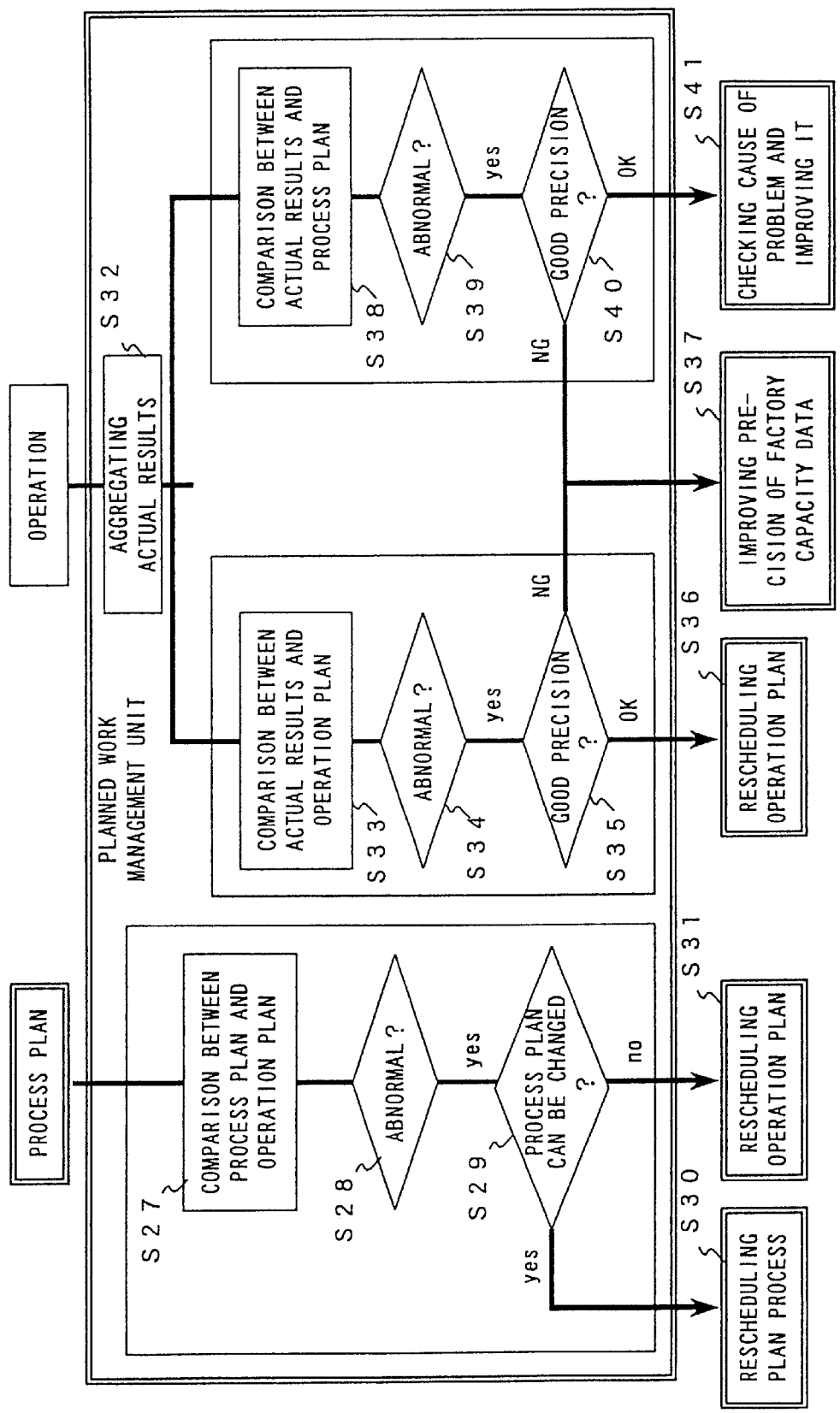
FIG. 9 is a flowchart showing the process of comparing the operation plan with its result or the process plan with its result.
Figure 10:
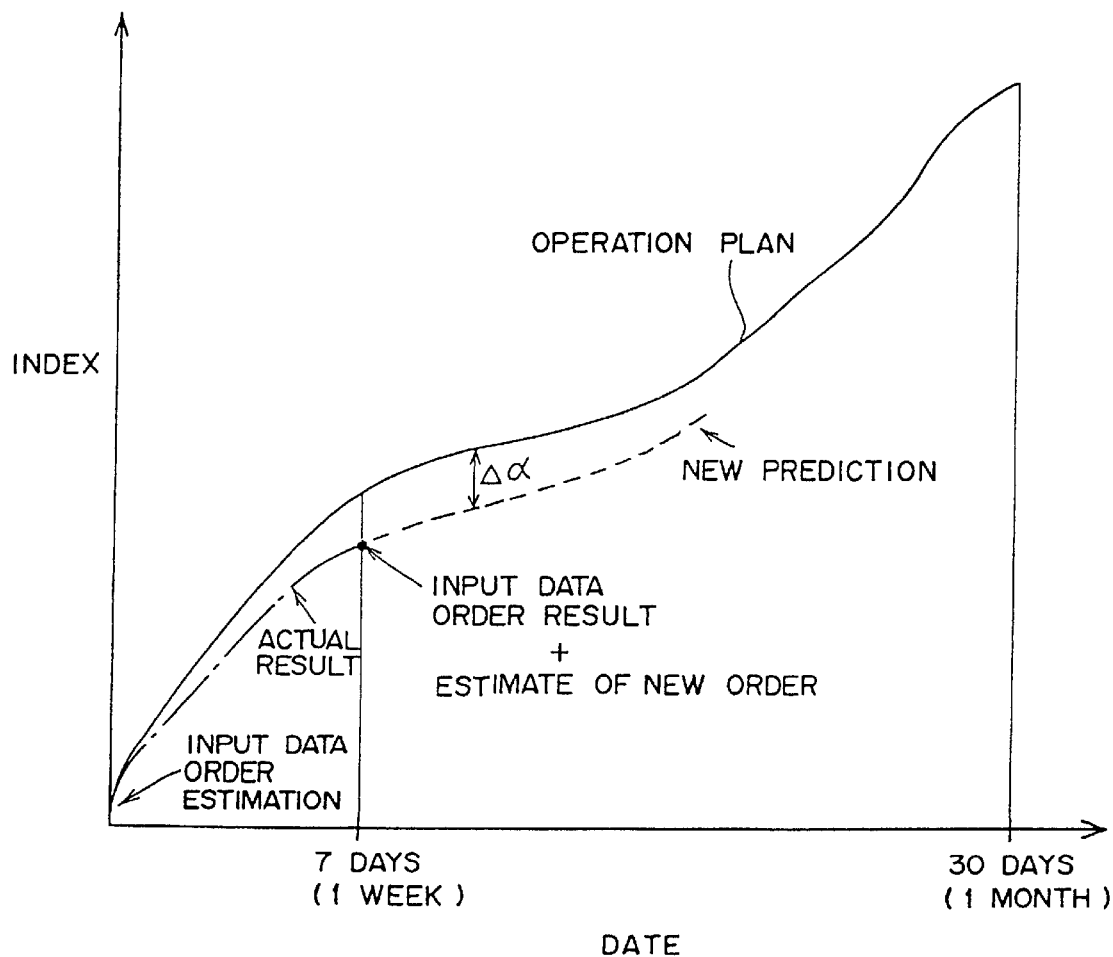
FIG. 10 shows an abnormal condition between the operation plan and the process plan.

For example, FIG. 9 is a flowchart showing each comparison process. Described first is the comparing process between the operation plan and the process plan. The comparison process is shown in FIG. 9A. The planned work management unit 4 compare both data (S27), and determines whether or not there is an abnormal condition between the data (S28). For example, FIG. 10 shows the meaning of the above described abnormal condition. In FIG. 10, a solid line indicates, for example, a prediction (operation plan) for a month (30 days), and a one-dot chain line indicates a result for one week from the start of the operation plan. The vertical axis shown in FIG. 9 indicates an index of, for example, the number of output lots, the turnover, etc.

In this state, when a process plan for the first week is generated, and if the process plan including a new order, etc. is set as indicated by the dotted lines, then the differences are compared, and it is determined whether or not they are within a predetermined allowable value. For example, if the allowable value is $\Delta\alpha$, it is determined that an abnormal condition exists when the space between the solid line of the operation plan and the dotted line of the process plan exceeds $\Delta\alpha$ (YES in S28).

If it is determined that an abnormal condition exists, it is further determined whether or not it is possible to reschedule the process plan (S29). If yes (YES in S29), then the process plan is rescheduled (S30). If not (NO in S29), then the operation plan is checked again (S31). In this case, for example, a new order is moved to other line, and a saving process such as a change in due date, etc. is performed.

Explained next is the comparison between an actual result and an operation plan or an actual result and a process plan. First, the comparison between the actual result and the operation plan is performed.

In this process, as shown in FIG. 9B, the planned work management unit 4 aggregates the data (actual data) provided from the operation plan unit 1 and the process plan unit 2. Then, the actual result is compared with the operation plan (S33). For example, it is confirmed which step has been reached in processing a lot. Then, it is determined that an abnormal condition exists when the preprocessing step is followed even if the ion implantation step should have been reached in the operation plan, or when the preprocessing step is not started even if the etching step should have been completed (Yes in S34).

Figure 11:
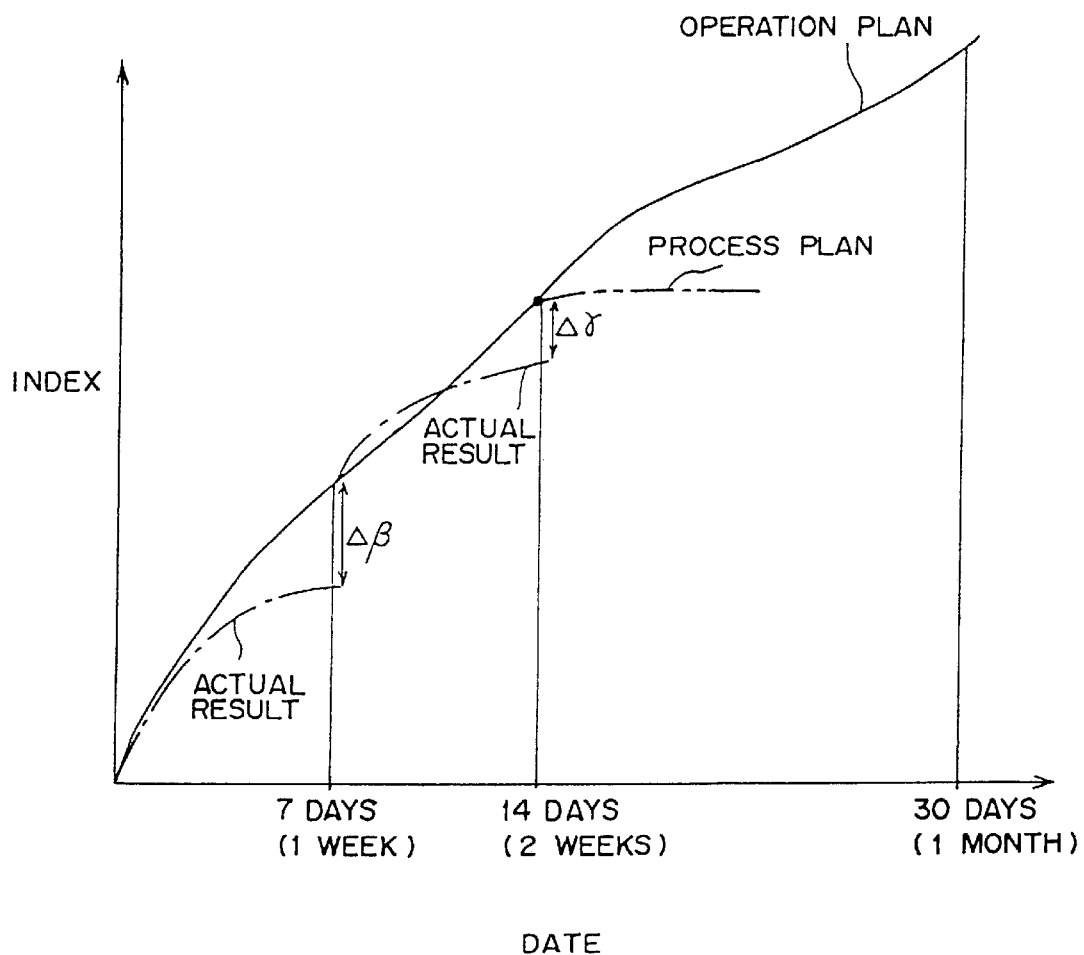
FIG. 11 shows an abnormal condition between the process plan and its result, and the operation plan and its result.

For example, FIG. 11 shows the above described state. In FIG. 11, the solid line indicates a prediction for a month (30 days) as described above, and the one-dot chain line indicates, for example, an actual result of one week from the start of the operation plan. The vertical axis shown in FIG. 11 indicates an index of, for example, the number of output lots, the turnover, etc.

In this case, the operation plan indicated by the solid line is separated from the actual result indicated by the one-dot chain line. For example, the space exceeds $\Delta\beta$, which is an allowable value. Therefore, it is determined that an abnormal condition exists (YEW in S34).

In this case, determination is made for precision to detect the cause of the abnormal condition (S35). The determination for precision is made by determining whether the abnormal condition is caused by the operation plan itself or the field conditions. If it is caused by the operation plan itself (OK in S35), then the operation plan is checked again (S36). If the operation plan is OK and the abnormal condition comes from the field conditions (NG in S35), then the capacity of the factory should be improved (S37). For example, the availability of the equipment and operators is improved, or the number of operators is increased, etc.

By performing the above described processes, the difference between the result and the operation plan can be reduced, and the operation plan can be correctly carried out. Therefore, the production activity can be efficiently performed. In addition, since the improvement is realized using the same algorithm and parameter in a plan such as the operation plan, etc., it can be realized by automatically and consistently performing a simulation, scheduling, etc.

Described next is the comparison between an actual result and a process plan. Also in this case, actual results are aggregated (S32). Based on the aggregation, the actual result is compared with the process plan (S38). Then, it is determined whether or not an abnormal condition exists between them (S39).

In this example, the process plan is indicated by the two-dot chain line as shown in FIG. 11. For example, the actual result is compared with the process plan for the second week, and it is determined whether or not the difference exceeds the allowable value $\Delta\gamma$. For example, if an impossible new order is placed, the process plan has to be rescheduled for a long delay, then the allowable value of $\Delta\gamma$ is largely exceeded, thereby indicating an abnormal condition (YES in S39).

In such a case, determination is made for precision to detect the cause of the abnormal condition (S40). The determination for precision is made as to whether or not the abnormal condition has been caused by the process plan itself or by the field conditions. If it has been cause by the process plan itself (OK in S40), then the cause is carefully checked to take appropriate countermeasures (S41). On the other hand, if the abnormal condition has been caused, not by the process plan, but by the field conditions (NG in S40), then the capacity of the factory should be improved (S37). That is, as described above, the ability of the equipment and operators should be improved, and the number of operators should be increased, etc.

By performing the processed as described above, the difference between the actual results and the process plan can be improved, thereby correctly carrying out the process plan and efficiently performing the production activity.

In addition, according to the present embodiment, the operation plan unit 1 uses parameters and simulations to carry out the process plan and the work plan. Therefore, even if the original operation plan cannot be carried out due to an unexpected failure or accident of an equipment, etc., a substitute equipment can take over the simulation. Then, a recovery plan can be immediately prepared.

In FIGS. 9A and 9B, an alarm system can be included for the case in which an abnormal condition is detected in the comparison between a process plan and an operation plan. Furthermore, the alarm can be given by an alarm message, an alarm sound, and many other methods.

The system can also be designed such that a plan of using the optimum materials, jigs, etc., a plan of providing a reticle, and a plan of maintaining equipments can be distributed according to the progress support information as in the first embodiment.

Thus, the progress information can be correctly provided for each equipment even in a factory which is not currently provided with the appropriate progress information about each equipment.

<Second Embodiment>

The second embodiment of the present invention is described below.

Figure 13:
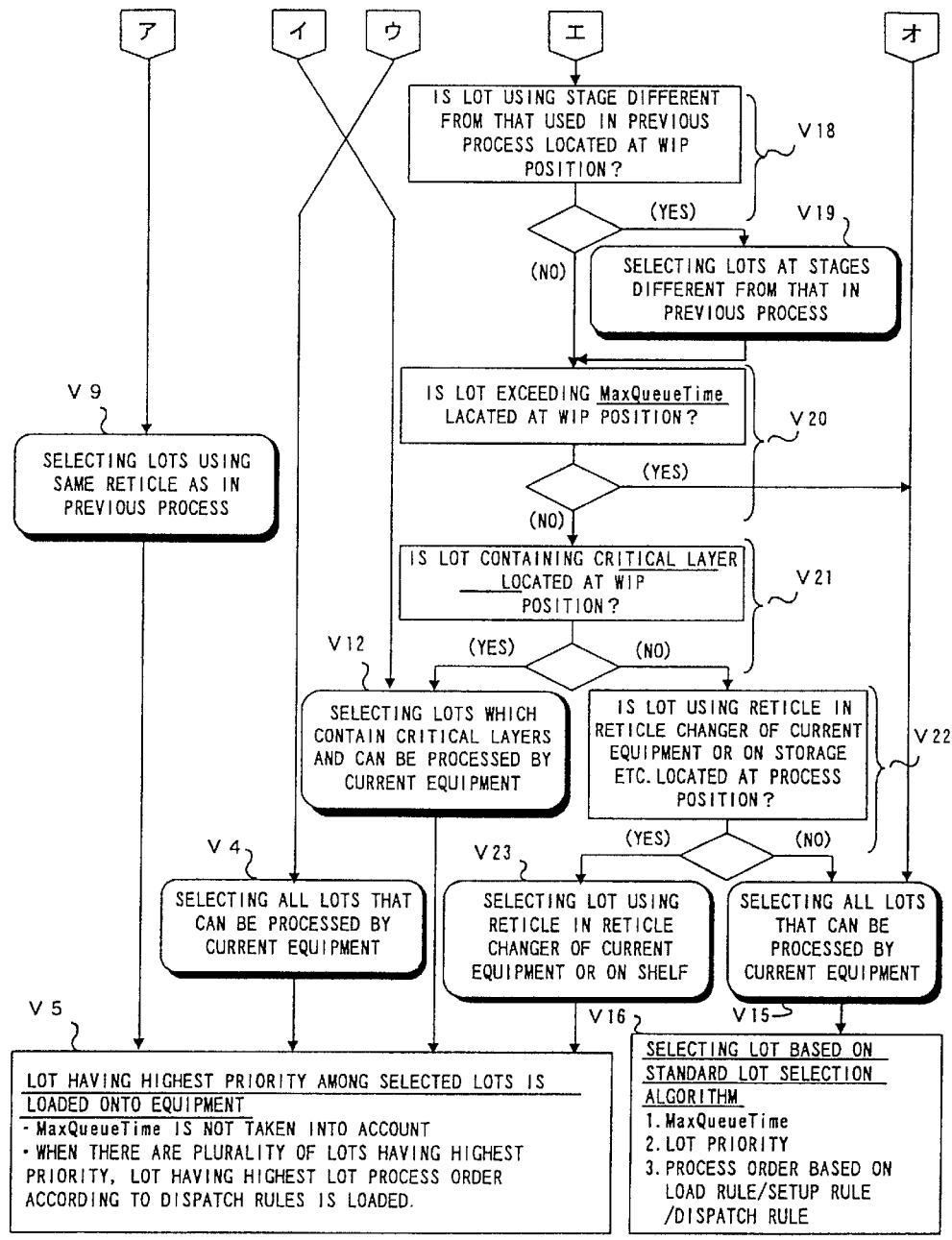
FIG. 13 is a flowchart showing the second embodiment of the present invention.
Figure 14:
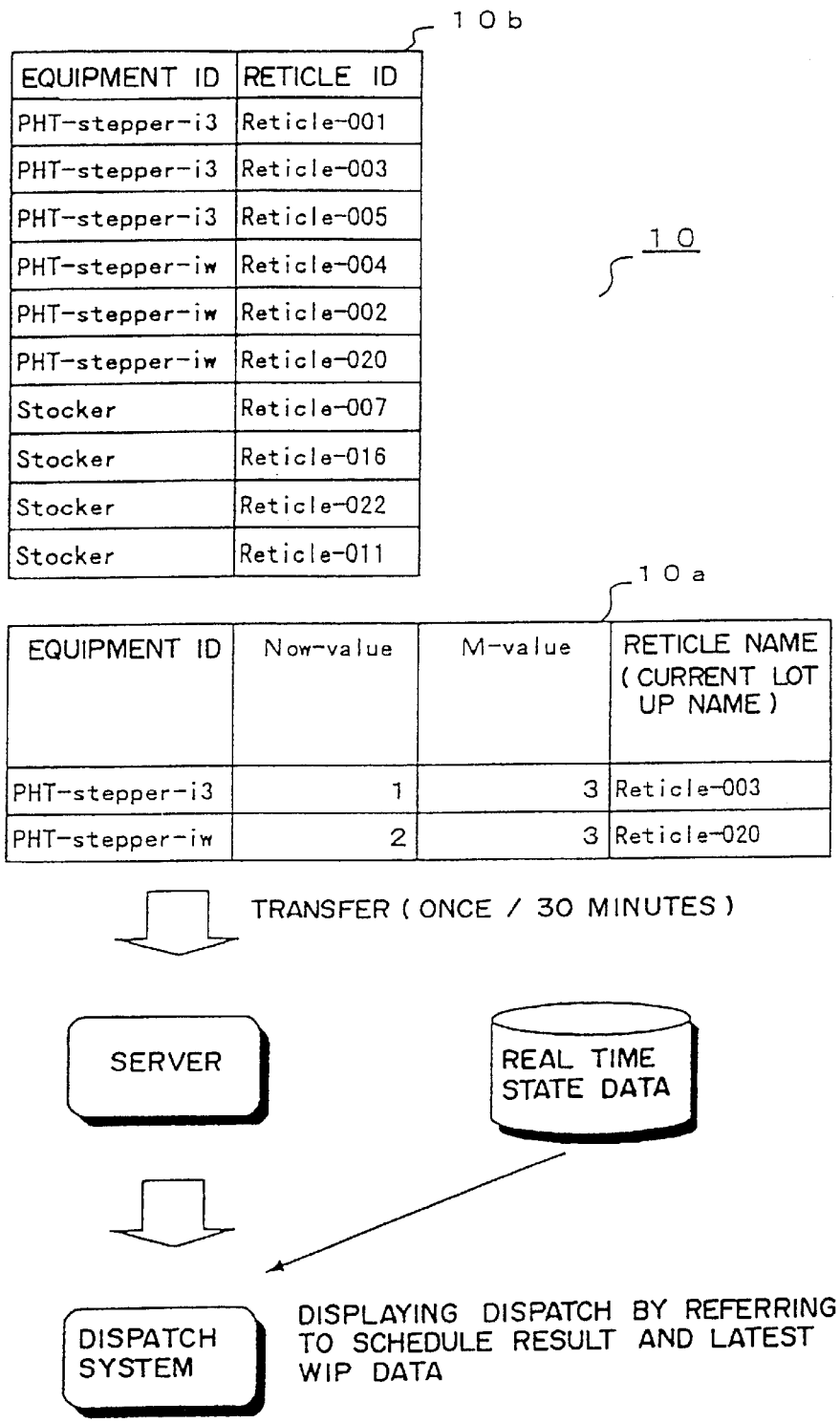
FIG. 14 shows a reticle library in an equipment, and the upper limit of the reticle capable of performing the same process.

The second embodiment refers to an example of selecting a lot in an equipment. FIGS. 12 and 13 are flowcharts explaining the process. FIG. 14 shows the information stored on the RAM 10. FIG. 10A shows an example of setting the upper limit of the frequency of continuous use described later. FIG. 10B shows the library of the reticle used for each equipment. For example, the equipment PHT-stepper-i3 (photostepper-i3) has three reticles-001, -003, and -005). The equipment PHT-stepper-iw (photostepper-iw) also has three reticles-004, -002, and -020). The reticle stocker stores four types of reticles-007, -016, -022, and -011).

The above described information is transferred to the server at intervals of once in 30 minutes. Real time status data is also provided for the server, and the dispatch system refers to a schedule result and the latest process data to obtain a dispatching display.

First, in the flowchart shown in FIG. 12, for example, when the process of a lot is completed in an equipment, the equipment enters an idle state. When the equipment enters the idle state, a lot, which can be processed by the equipment, is selected (step V1). First, the CPU 5 sets a target lot to be processed by the equipment (V2). For example, determination is made based on the capacity of the equipment, the contents of the process, etc.

Next, it is determined whether or not the highest-order lot in the priority among the lots to be processed exists in the WIP position (V3). For example, a lot assigned a short process period by a client is a lot having a higher priority. Such a lot is assigned the LotPriority of 1. Therefore, if the lot having the LotPriority of 1 exists in the lots to be processed by the equipment, the lot is first selected (YES in V3). In this case, control is transferred to step V4 shown in FIG. 13, and the lot process is performed on all lots to be processed by the equipment. Furthermore, in process (V5), the lot having the highest priority among the selected lots is loaded onto the equipment. In this case, the selected lot has the LotPriority of 1. Therefore, the lot having the highest priority among the lots having the LotPriority of 1 is first loaded onto the equipment.

In the process (V5), MaxQueueTime indicates the limit value of a wait time of a lot in the process position. When the MaxQueueTime is taken into account, it is not possible to keep a lot waiting longer than the time. However, in process (V5), the MaxQueueTime is not taken into account. Furthermore, a dispatch rule is a rule for use in selecting a lot so that a lot having the highest process level can be loaded.

Then, back to the determination (V3) shown in FIG. 12, when the lot having the LotPriority of 1 does not exist in the WIP position (NO in V3), it is determined whether or not the upper limit for the continuous process on the same recipe is exceeded (V6). If the frequency of continuous use process exceeds the upper limit, then the same reticle is continuously used. To avoid this, the above described determination is made. Therefore, as shown in FIG. 14, the upper limit of the number of processes in which the same reticle can be used is set in the RAM 10 for each reticle. That is, in the area 10a shown in FIG. 14, for example, the upper limit of the frequency of continuous use process is set for a reticle in each equipment. For example, the upper limit of the frequency of continuous use process of the reticle-003 in the equipment having the ID of PHT-stepper-i3 (photostepper i3) is set to 3. The upper limit of the frequency of continuous use process of the reticle-020 in the equipment having the ID of PHT-stepper-iw (photostepper iw) is also set to 3. Therefore, in the process of selecting a lot for the equipment, the number of selected lots cannot exceed the upper limit of the frequency of continuous process. Now value in the area 10a shown in FIG. 14 indicates the number of lots being used continuously.

Therefore, when the above described frequency of continuous use does not exceed the upper limit (NO in V6), a process can be performed using the reticle, and it is determined whether or not a lot using the previously used reticle exists in the WIP position (V7). If a lot using the previously used reticle exists in the WIP position (YES in V7), it is further determined whether or not a lot having the LotPriority of 2 or 3 exists in the lots using the previously used reticle (V8). If yes, a lot is selected from among the lots using the previously used reticle (V9), and the target lot is loaded onto the equipment (V5). As to which lot among the loaded lots is to be processed by priority, the lot having the highest priority in the selected lots is first loaded onto the equipment (V5) as described above, and the lot is processed.

In the above described determination (V8), a lot having the LotPriority of 2 or 3 does not exist in the lots using the previously used reticle (NO in V8), it is determined whether or not the lot previously process contains the critical layer stage (V10). If it is in the critical layer stage (YES in V10), then a lot using the previously used reticle is to be processed as described above (V9), and the selected lot is loaded onto the equipment (V5). In the specific equipment, a lot being in a critical layer stage is processed by priority because it is indispensable to use an equipment containing a high performance in producing a critical layer of a semiconductor device.

Therefore, a lot being in a critical layer stage is processed by priority as follows. That is, in the above described determination (V10), if the previously processed lot is in a non-critical layer stage (NO in V10), it is determined whether or not the lot being in the critical layer is at the WIP position (V11). If the lot being in the critical layer stage does not exist at the WIP position (NO in V11), then, as described above, a lot using the previously used reticle is to be selected (V9), and the selected lot is to be loaded onto the equipment (V5).

On the other hand, if a lot being in a critical layer stage is located in the WIP position (YES in V11), the lot having the highest priority in the lots being in a critical layer stage which can be processed by the equipment (S12) is loaded onto the equipment (V5). That is, in this case, when a lot being in a critical layer stage is in the WIP position, the lot being in the critical layer stage is selected for process so that the lot being in the critical layer stage can be processed first.

Described below is the case in which the frequency of continuous use using the same recipe exceeds the upper limit in the above described determination (V6) (YES in V6).

First, it is determined whether or not the lot having the LotPriority <6 is in the WIP position (V13). When the lot is in the WIP position (YES in V13), the lot having the highest priority in all lots which can be processed by the equipment is first loaded (V4, V5). That is, in this case, the process using the same reticle cannot be continued. Therefore, a lot using a different reticle having the LotPriority of 6 or smaller is selected.

On the other hand, when the lot is not in the WIP position (NO in V13), it is determined whether or not a lot using a reticle different from the reticle of the previous process is in the WIP position (V14). If the lot using a reticle different from the reticle of the previous process is not in the WIP position (NO in V14), then all lots which can be processed by the equipment are considered (V15), and a lot is selected according to the lot selection algorithm (V16). That is, in this case, a lot is selected according to the process procedure based on the lot priority, load rules, set-up rules, and dispatch rules with the above described MaxQueueTime taken into account.

In the above described determination (V14), when a lot using a reticle different from the reticle of the previous process is in the WIP position (YES in V14), a lot at a stage different from the stage of the previous process is in the process position (V18) in the lots using the reticles different from the reticle of the previous process (V17). A stage different from the stage of the previous process refers to the case in which a lot is processed in different process stage in production of a semiconductor integrated circuit. If a lot is processed in a different step (YES in V18), only lots at a stage different from the stage of the previous process are selected (V19).

Then, it is determined whether of not a lot exceeding the MaxQueueTime is located in the WIP position (V20). If yes (YES in V20), all lots which can be processed by the equipment are taken into account (V15), and then lots are processed (V16). That is, in this case, the lot exceeding the MaxQueueTime is considered a selection target, and the lot exceeding the MaxQueueTime is processed.

On the other hand, when a lot exceeding the MaxQueueTime is not located in the WIP position (NO in V20), it is determined whether or not a lot being in a critical layer stage is located in the WIP position (V21). If a lot being in a critical layer stage is located in the WIP position (YES in V21), then, as described above, only the lots being in a critical layer stage which can be processed by the equipment are taken into account (S12), and the lot having the highest priority in the lots is loaded onto the equipment (V5) for a lot process. That is, in this case, a lot is selected from among lots being in a critical layer stage which can be processed by the equipment so that the process can be performed on the lots containing the critical layers and remaining in the process position.

If the lot being in a critical layer stage is not located in the WIP position (NO in V21), then it is determined whether or not a lot using a reticle in the reticle changer of the current equipment or stored on a storage is located in the WIP position (V22). When a lot using the above described reticle is located in the WIP position (YES in V22), only the corresponding lots are taken into account (V23), and the lot having the highest priority among them is first loaded onto the equipment (V5). On the other hand, if a lot using the above described reticle is not located in the WIP position (NO in V22), all lots which can be processed by the equipment are taken into account, and a lot is selected (V15, V16).

The above described processes are performed when an equipment enters an idle state, and a lot can be automatically assigned by applying the same algorithm to the equipments used in the present embodiment. In the above described embodiment, a lot is assigned to an equipment. However, in addition to the assignment of a lot, the corresponding algorithm can be applied to the number of output lots, the turnover of an equipment, etc.

Figure 15:
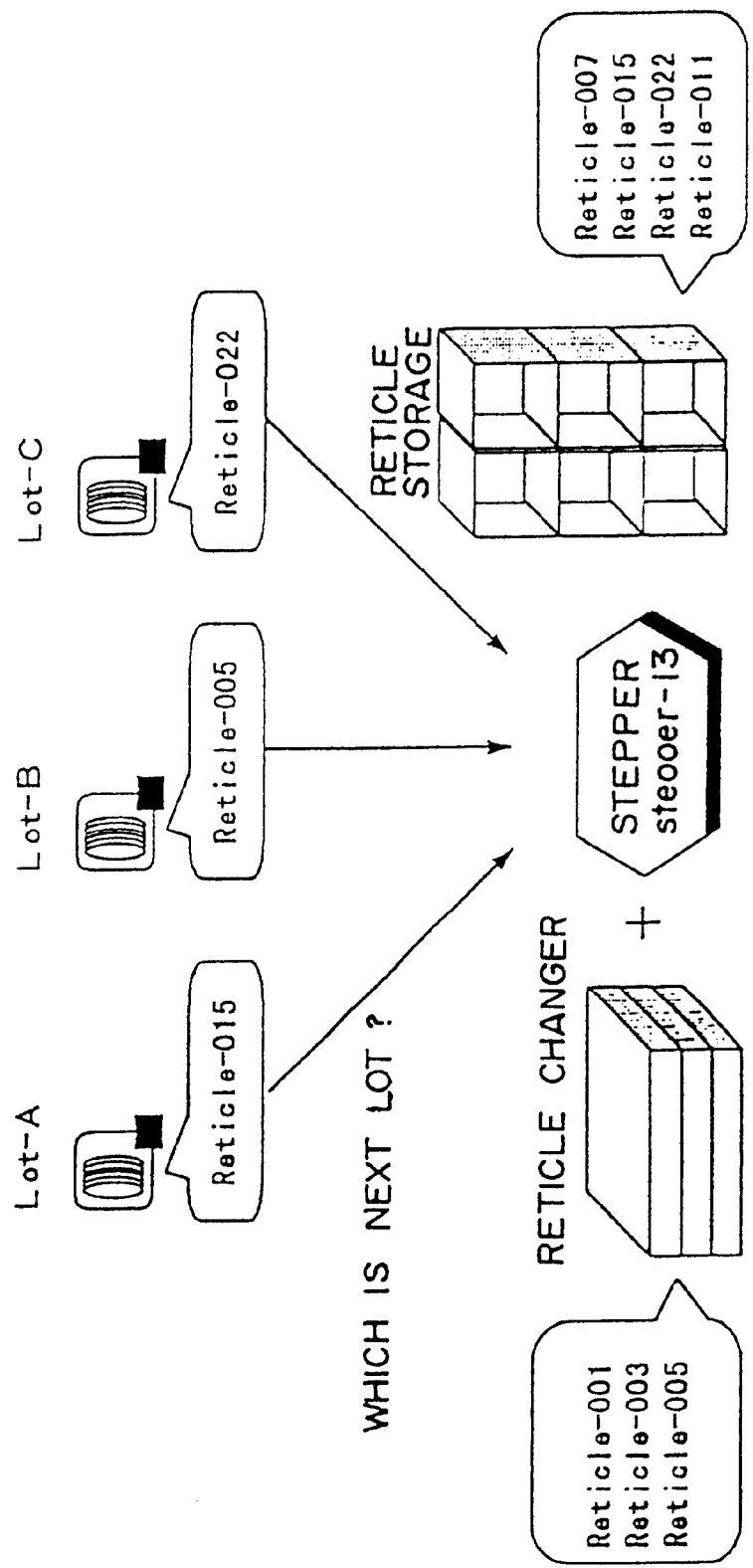
FIG. 15 shows an example of changing a reticle based on a selection lot.

FIG. 15 shows the process of selecting a subsequent lot when the equipment PHT-stepper-iw (photostepper-i3) enters an idle state. That is, as shown by 10b in FIG. 14, there are three reticles (reticles-001, -003, and -005) for the equipment PHT-stepper-i3 (photostepper-i3). The reticles for processing the lots A, B, and C shown in FIG. 15 are reticles-015, -005, and -022, and only the reticle-005 exists in the equipment. In this case, the lot B is selected because the reticle in the equipment is available to the lot B. Next, for example, the lot A is processed by fetching, and then using, the reticle-015 from a reticle storage. Last, the reticle-022 is fetched from the reticle storage, and is used to process the lot C.

<Third Embodiment>

Described below is the third embodiment of the present invention.

According to the present embodiment, the process position of a lot can be obtained by obtaining the state of the equipment as in the first embodiment of the present invention, and the optimum work plan is made even if the resolution of factory tracking data is not a process step level.

Figure 16:
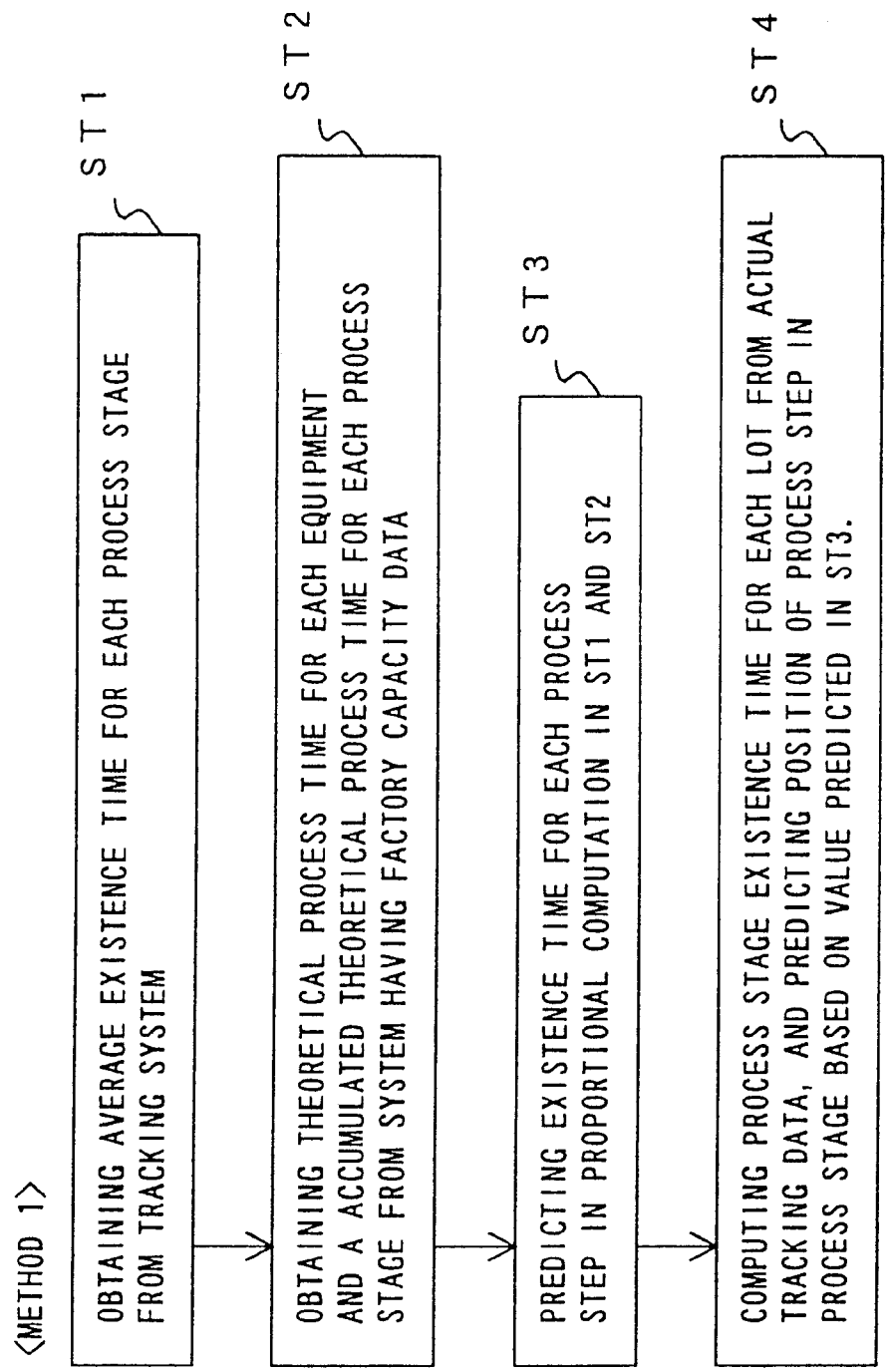
FIG. 16 is a flowchart showing the third embodiment of the present invention.
Figure 17:
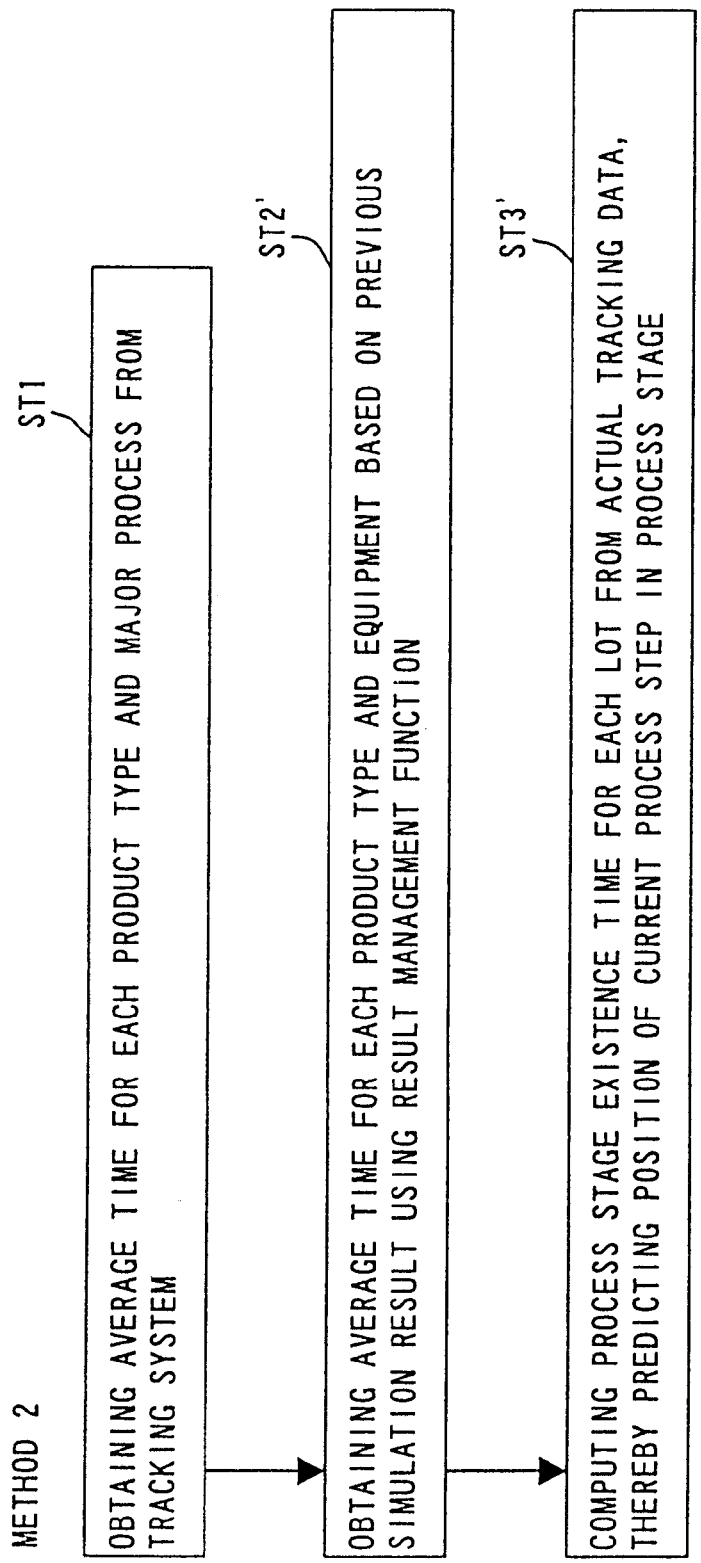
FIG. 17 is a flowchart showing the third embodiment of the present invention.

FIG. 16 shows a method of obtaining the process step position of a lot when no simulation is used. FIG. 17 is a method of obtaining the process step position of a lot using a simulation according to the present embodiment.

Figure 18:
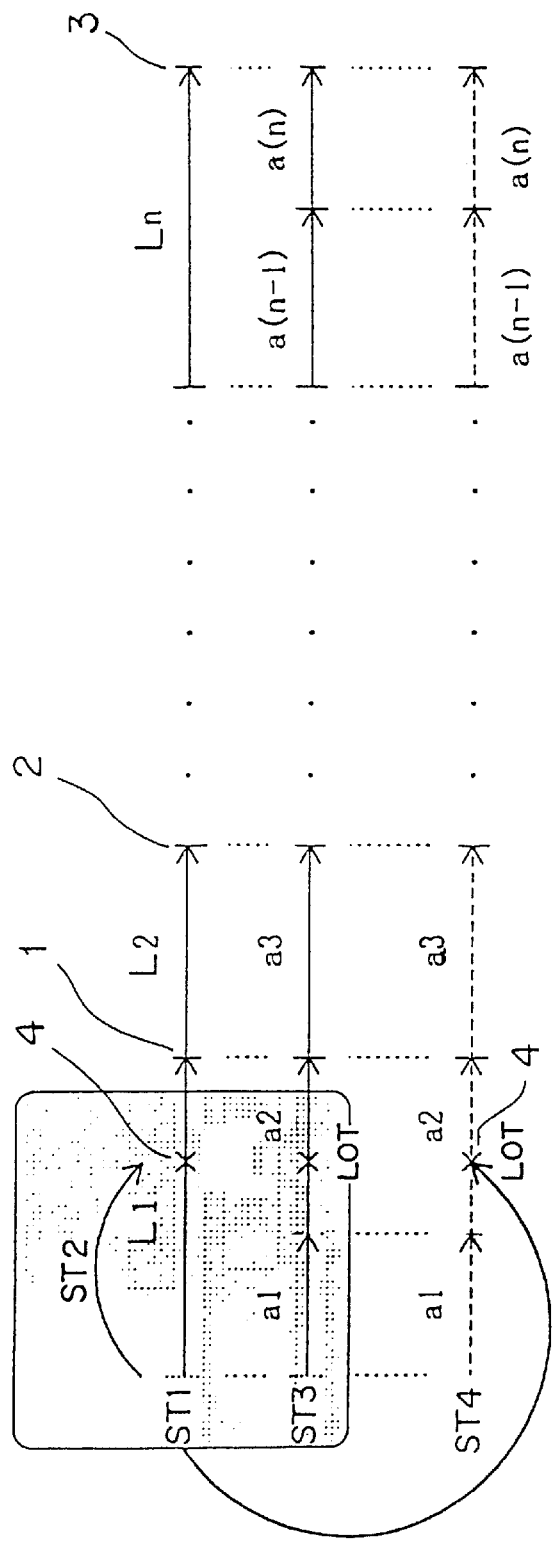
FIG. 18 shows the average number of process steps, etc.

First, the method shown in FIG. 16 is described. In this case, an average existence time is obtained for each process stage based on a tracking system (the steps are hereinafter represented by ST . . . ). FIG. 18 shows the above described processes. L1, L2, . . . shown in FIG. 18 indicate the existence time for each process stage. That is, an average existence time of the first process stage is L1, and it terminates at time 1. An average existence time of the second process stage is L2, and it terminates at time 2. Similarly, an average existence time of the last (n-th) process stage is Ln, and it terminates at time 3. A process stage refers to, for example, an ion implantation process, a diffusion furnace process, etc., and the process stage contains a process step in which each equipment functions. For example, when the process stage is a diffusion furnace, its process steps are a preprocess, a diffusion process, an after-treatment process, etc.

Next, a theoretical process time for each equipment and an accumulated theoretical process time for each process stage is obtained from the system having the factory capacity data (ST2). A theoretical process time for each equipment is preliminarily measured and stored as factory capacity data. With the theoretical process time for each equipment the accumulated theoretical process time is calculated.

Then, existence time of each process step is predicted by a comparison operation from the above described processes ST1 and ST2 (ST3). For example, by referring to the area indicated by the dotted pattern as shown in FIG. 18, the first process stage termination time (the above described time 1) is divided by the accumulated theoretical process time for each equipment in a process stage, and existence time a1 and a2 are predicted for each process step.

Next, the actual existing time is computed for each lot from the actual process stage reception time, and the lot position as the process step in process stage at present is predicted (ST4) based on the value obtained in the above described process (ST3).

For example, in the example shown in FIG. 18, it is predicted that the position of the lot being processed is 4 by computing it from the process stage reception time, and the equipment which is currently processing the lot is a2.

Next, the method shown in FIG. 17 uses the result of a simulation. In this case, an average existence time for each process stage is obtained from a tracking system (ST1).

Then, using the result management function, an existence time is obtained for each process step based on the previous simulation result (ST2'). Next, an actual existing time is computed for each lot from the process stage reception time described in the WIP data, thereby predicting the current process step of the lot (ST3').

In this case, since an existence time for each process step is obtained based on the previous simulation result, for example, the existence time a1, a2, etc. can be immediately obtained for each process step. Furthermore, the existence time for each product type, etc. can be easily obtained. Therefore, when the actual existence time is immediately obtained for each lot from the process stage reception time described in the WIP data, the current process step position of the lot can be immediately predicted.

Furthermore, a work plan is made based on the obtained position of the lot, and the more accurate work plan can be generated. The above described process is performed by the WIP position estimate unit 19 shown in FIG. 2.

<Fourth Embodiment>

Described below is the fourth embodiment of the present invention.

The present embodiment is designed to make an operation/process/work plan by automatically generating performance data for each equipment and recipe from the performance data of the existing equipment, equipment type, and work station in a factory even if the performance data of a new product does not exist. In the present embodiment, the basic configuration of the production estimate management system is shown in FIG. 1, and the concept of the production estimate management system is shown in FIG. 3. The processes performed by the process plan units 2 through 5 are shown in FIGS. 4 through 8.

The processes are concretely described below. FIG. 19 shows the relationships among the contents of the equipments to be used, the type of the equipments, work stations, names of equipments, names of recipes, and capacity. For example, the equipment type A in the semiconductor factory has two work stations A1 and A2. The work station A1 is composed of two equipments A11 and A12. The work station A2 is composed of one equipment A21. Furthermore, the equipment A11 has two recipes-m01 and -m02. The equipment A12 also has two recipes-n01 and -n02. The equipment A21 has three recipes-o01, -m02, and -o03.

Each capacity is set by process time. For example, when the recipe-m01 of the equipment A11 is used, the process time is 15 min/p. In addition, for example, when the recipe-n02 of the equipment A12 is used, the process time is 12 min/p.

There are a lot of equipments other than the facility type A in the factory. The configuration of the facility type A shown in FIG. 19 is that of only a part of the equipment.

On the other hand, the lot being processed is assigned the process procedure. For example, as shown in FIG. 20, the process procedure of the lot a in the equipment type A is described such that a process of the recipe-m01 of the equipment A11 of the work station A1 can be performed, and then, a process of the recipe-n02 of the equipment A19 of the same work station A1 can be performed, and so forth. Therefore, the capacity data can be obtained by reading the process time shown in FIG. 19 based on the above described process procedure to make an operation/process/work plan.

The process procedure of the lot b is shown in FIG. 19, and the capacity data is obtained by reading the process time shown in FIG. 19 based on the above described process procedure to make an operation/process/work plan.

Figure 21:
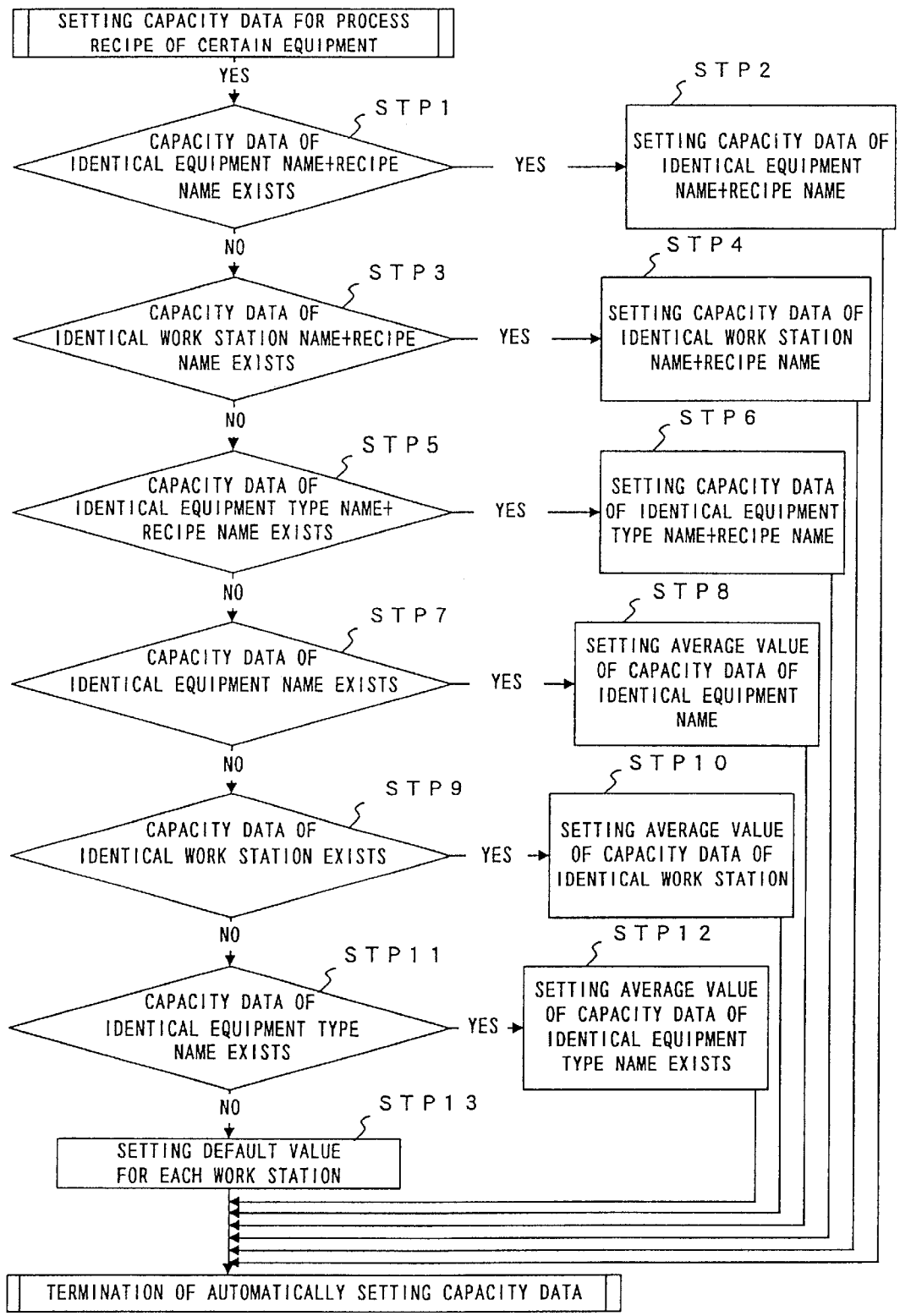
FIG. 21 is a flowchart showing the operation of a process according to the fourth embodiment of the present invention.

Described next is the case in which a new process is started. In this case, the process procedure is preliminarily set. However, the process time for each equipment and recipe is not known, and the flowchart shown in FIG. 21 is used to compute the capacity.

First, the equipment and the recipe related to the first process of the new process procedure are read, and it is determined whether or not the identical combinations of the equipment and the recipe exist (step 1). If the identical combination of the equipment and the recipe exists, the corresponding process time is read and the data of the capacity is set (YES in STP1)(STP2). For example, in the above described example, when the first new process procedure relates to the equipment A11 and the recipe-m01, a combination of the same equipment and recipe exists, and the corresponding process time 15 min/p is read and set as the capacity data.

In the above described determination (STP1), if the identical combination of the equipment and the recipe does not exist, the subsequent determination is made (STP3). The determination is made as to whether or not the identical combination of the work station and the recipe exists. That is, since the identical combination of the equipment and the recipe does not exist, the condition of the identical combination of a higher order work station and recipe is searched for.

Therefore, if the identical combination of the work station and the recipe exists, then the corresponding process time is read and the data of the capacity is set (YES in STP3) (STP4). On the other hand, if the identical combination of the work station and the recipe does not exist, then the next determination is made (STP5).

The determination is made about the condition of the identical combination of a higher order equipment type A and a recipe. For example, a combination of the equipment type A and the recipe-o03 is shown in FIG. 19 and the process time is 13 min/p. However, a new process procedure does not refer to the work station A2 or the equipment A21. In this case, the data of the corresponding process time is set (STP6).

On the other hand, when no identical combination of the equipment type A and the recipe exists in the above described determination, next determination is made (STP7). That is, in the subsequent steps, an identical item, not an identical combination, is checked. In the determination (STP7), the identical equipment is searched for. For example, when the equipment A12 is used, the equipment A12 corresponding to the description shown in FIG. 19 exists (YES in STP7). In this case, an average value of the capacity data relating to the equipment A12 is set (STP8).

For example, in the above described example, 13 min/p is set as an average value between 12 min/p and 14 min/p.

If the identical equipment does not exist, the identical work station is searched for (N in STP7)(STP9). For example, if the work station A2 is specified, the corresponding work station A1 exists as shown in FIG. 19 (YES in STP9). In this case, an average value of the capacity data relating to the work station A2 is set (STP10). In the above described example, 12 min/p is set as an average value among 11 min/p, 12 min/p, and 13 min/p.

On the other hand, if the identical work station does not exist, it is determined whether or not the identical equipment type A exists (N in STP9)(STP11). If the equipment type A exists (YES in STP11), an average value of the capacity data relating to the equipment type A is set (STP12).

Although it exists in the present embodiment, there can be the case in which no equipment type A exists. In this case, finally, a default value is set for each work station (STP13).

In the above described process, the capacity data relating to the first process of the new process procedure can be set, and then, the capacity data relating to the second, third, . . . processes are similarly set, thereby the capacity data can be completely set.

By performing the above described processes, the capacity data can be easily set even for an unknown process menu, thereby automatically generating the capacity data, and automatically preparing an operation/process/work plan.

The above described process is performed by a process recipe data automatic generation unit 22 shown in FIG. 2.

<Fifth embodiment>

Described below is the fifth embodiment of the present invention.

According to the present embodiment, the basic data group for the operation plan and the plan data group prepared at the early stage are compared with the current basic data group and the plan data group. If there are any differences, then an operation prediction from the present to the end of the period is automatically made, and the current operation prediction is compared with the operation plan made at the early stage. If the comparison result exceeds a predetermined allowable value, then an alarm is automatically given to flexibly correspond to a change of a production plan during the period without trouble.

Figure 22:
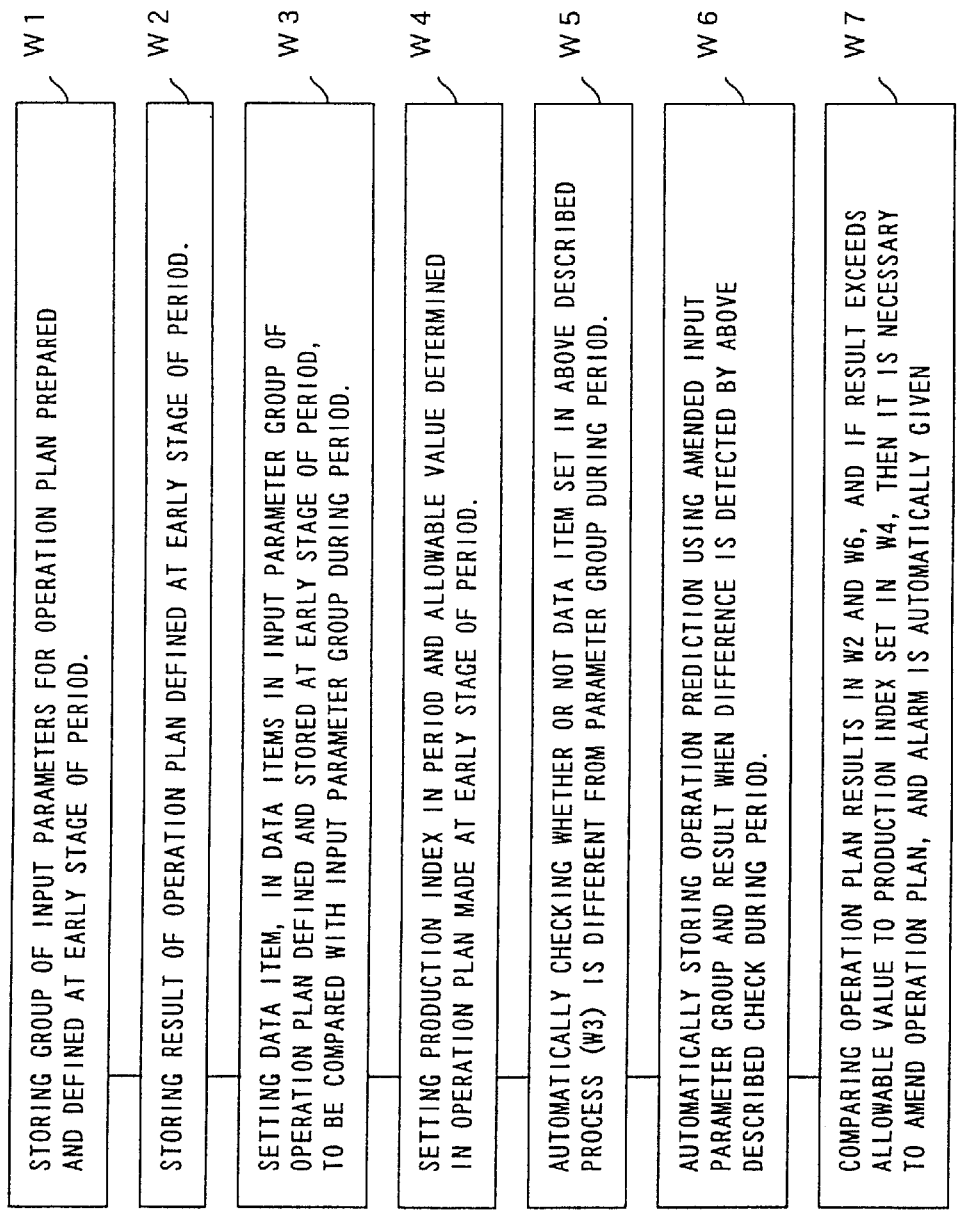
FIG. 22 is a flowchart showing the operation of a process according to the fifth embodiment of the present invention.

The present embodiment is described below by referring to the flowchart shown in FIG. 22.

First, a group of input parameters for an operation plan prepared and defined at the early stage of the period are stored (step W1). As a group of parameters, for example, the number of equipments, the specification of an equipment, the number of menus, the ending date of a specified lot, etc. are stored.

Next, the result (output data) of an operation plan defined at the early stage of the period is stored (W2).

Then, in the data items in the input parameter group of the operation plan defined and stored at the early stage of the period, the data item to be compared with the input parameter group (which can be changed) during the period is set (W3). For example, when it is requested that the parameter relating to the number of equipments in the above described parameters is compared, the corresponding parameter is set. In addition, when it is requested that the parameter relating to the number of menus in the above described parameters is compared, the corresponding parameter is set.

Next, the production index (production plan) in the period and the allowable value determined in the operation plan made at the early stage of the period are set (W4). The above described production index is, for example, the number of outputs, the number of process moves, the turnover, etc. The allowable value refers to a threshold for an object value, and can be represented as 90%, 85%, etc. for the object value.

After the above described settings, it is automatically checked whether or not the data item set in the above described process (W3) is different from the parameter group during the period (W5). For example, during the period, it is checked when the number of equipments, which are set data items, decreases, when a new product starts, etc. In these cases, the operation plan receives a large influence, and therefore the following processes are performed.

That is, when a difference is detected by the above described check during the period, the operation prediction using a rescheduled input parameter group and a result (output data) are automatically stored (W6). In the above described process (W2), the defined operation plan result is compared with the operation plan result. If the result exceeds the allowable value to the production index set in the above described process (W4), it is necessary to reschedule the operation plan, and an alarm is automatically given (W7).

For example, if the number of working equipments decreases after one ion implantation equipment becomes failure, and the number of processed lots in the ion implantation process decreases lower than the allowable value (for example, 90%) for the production index, then it is necessary to reschedule the operation plan, and an alarm is automatically given.

As described above, the basic data group for the operation plan and the plan data group prepared at the early stage are compared with the current basic data group and the plan data group. If there are any differences, then an operation prediction from the present to the end of the period is automatically made, and the current operation prediction is compared with the operation plan made at the early stage. If the comparison result exceeds a predetermined allowable value, then an alarm is automatically given to flexibly correspond to a change of a production plan during the period without trouble.

In the above explanation, a parameter is a change of the number of equipments or products. For example, the parameter also can be a change of a due date of a specific lot, a change of the number of contained reticles, etc.

In addition, the alarm can be given by a display, sound, and many other methods.

Furthermore, the above description according to the present embodiment relates to the case where the production estimate management system according to the present invention is applied to the factory of a semiconductor device. However, the present invention can be similarly applied only if the factory is a jobshop type.

Furthermore, the production estimate management system according to the present invention can be realized using the system shown in FIG. 23. That is, as shown in FIG. 23, the CPU (computer) 5 performs the process of the above described production estimate management system using the program (data) provided by the internal RAM and the hard disk 6.

As shown in FIG. 23, not only the program (data) is provided by the internal RAM and the hard disk 6, but also data can be transmitted to and received from an external storage device. For example, a process can be performed based on the program (data) provided by a storage medium such as a magnetic disk, a magnetic tape, a floppy disk, an optical disk, etc.

Furthermore, as shown in FIG. 23, a program from a user 8 through a communications line can also be used.

As described above in detail, each of the process plan and the work plan is used by inheriting the result of the simulation performed using the operation plan. Therefore, a consistent plan can be prepared.

In addition, a plan can be compared with a result through plan/result management, and an analysis can be made as to whether or not an appropriate operation plan has been made depending on each factory, whether or not the capacity of a factory is fully utilized, etc.

Furthermore, the schedule of using the optimum material, jigs, etc. and the schedule of maintaining equipments can be distributed to relevant departments. Therefore, in a factory in which the progress information for each equipment of a product cannot be grasped, the progress information for each equipment of a product can be correctly predicted.

It is recommended that the latest WIP information and equipment state can be obtained at any time when a plan is designed. However, even if it is impossible, a plurality of functions of making a work plan can be provided depending on the resolution of the tracking data and the response of the system to make a practical work plan.

In addition, for new process information having no actual work results, the capacity data can be quickly generated, and an operation plan can be set.

Furthermore, for example, when products are made upon orders, an alarm, etc. is given when a change is made to the operation plan based on the order prediction at the start of the period, thereby quickly taking action.

What is claimed is:

1. A production estimate management system, comprising:
   an operation plan unit setting a long-term operation plan using a specific algorithm and parameters;
   a process plan unit generating an intermediate process plan using the algorithm and parameters used in the operation plan of said operation plan unit;
   a work plan unit generating a short-term work plan using the algorithm and parameters used in the operation and the process plan; and
   a planned work management unit comparing an actual result performed based on the operation plan, the process plan, and the work plan with the operation plan or the process plan, and correcting the operation plan, the process plan, and the work plan when a comparison result indicates a problem.

2. The system according to claim 1, wherein
   the operation plan is compared with the process plan, and the operation plan or the process plan is changed as necessary.

3. The system according to claim 1, wherein
   the operation plan by said operation plan unit includes an input plan, moves target, a turnover target, and an output volume target for one week through a few months.

4. The system according to claim 1, wherein
   the process plan by said process plan unit relates to an amount and order of a process lot for one shift through a few days.

5. The system according to claim 1, wherein
   the work plan of said work plan unit relates to an assignment of a lot and an equipment in real time in each process step.

6. The system according to claim 1, further comprising:
   progress support information generation unit for distributing a plan of using a material and a plan of maintaining an equipment to relevant departments based on the process plan generated by said operation plan unit or said process plan unit.

7. The system according to claim 1, wherein an alarm is given when there is a problem between an actual result and the operation plan or the process plan, or between the operation plan and the process plan.

8. The system according to claim 1, wherein said algorithm refers to a process of selecting a new lot for each equipment in the system, determines whether or not a frequency of a use of an identical reticle exceeds an upper limit, and a lot using the reticle is not selected when the frequency of a use of the identical reticle exceeds the upper limit.

9. The system according to claim 1, wherein said algorithm refers to a process of selecting a new lot for each equipment in the system, and processes by priority a lot being in a critical layer stage.

10. The system according to claim 1, wherein a process position of a lot is estimated depending on a resolution of factory tracking data.

11. The system according to claim 1, wherein capacity data is automatically generated according to a new product information.

12. The system according to claim 1, wherein information for the operation plan made at an early stage of a period is compared with current information, an operation estimate is automatically made for a period from a present point to an end of a term when a comparison indicates a difference, and an alarm is automatically given when a preliminarily set allowable value is exceeded.

13. A production estimate managing method, comprising:
setting a long-term operation plan;
generating an intermediate process plan based on the operation plan;
generating a short-term work plan based on the operation plan and the process plan;
comparing an actual result performed based on the process plan and the work plan according to the operation plan with the operation plan, the process plan, and the work plan; and
correcting a problem if a comparison result indicates the problem.

14. The method according to claim 13, wherein a plan of using a material and a plan of maintaining an equipment are distributed to relevant departments based on the operation plan and the process plan.

15. The method according to claim 13, wherein a process step position of a lot is estimated depending on a resolution of factory tracking data.

16. The method according to claim 13, wherein capacity data is automatically generated according to a new product information.

17. The method according to claim 13, wherein information for the operation plan made at an early stage of a period is compared with current information, an operation estimate is automatically made for a period from a present point to an end of a term when a comparison indicates a difference, and an alarm is automatically given when a preliminarily set allowable value is exceeded.

18. A computer-readable storage medium storing a program used to direct a computer and comprising a process of:
setting a long-term operation plan;
generating an intermediate process plan based on the operation plan;
generating a short-term work plan based on the operation plan and the process plan;
comparing an actual result performed based on the process plan and the work plan according to the operation plan with the operation plan, the process plan, and the work plan; and
correcting a problem if a comparison result indicates the problem.

19. A production estimate management system, comprising:
an operation plan unit generating a long-term operation plan using a specific algorithm and parameters;
a process plan unit generating an intermediate process plan using the operation plan and the algorithm and parameters used in generating the operation plan;
a work plan unit generating a short-term work plan using the process plan and the algorithm and parameters used in generating the operation plan; and
a planned work management unit comparing the operation plan to the process plan, and comparing actual results to the operation plan, the process plan, and the work plan, and, when any of the comparisons indicates a difference greater than a specified amount, correcting one or more of the operation plan, the process plan, and the work plan.

* * * * *